(12) United States Patent
Lee et al.

(10) Patent No.: US 12,044,429 B2
(45) Date of Patent: Jul. 23, 2024

(54) AIR PURIFIER

(71) Applicant: LG ELECTRONICS INC., Seoul (KR)

(72) Inventors: Kunyoung Lee, Seoul (KR); Bohyun Kim, Seoul (KR); Dongeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/221,200

(22) Filed: Jul. 12, 2023

(65) Prior Publication Data
US 2024/0019165 A1 Jan. 18, 2024

(30) Foreign Application Priority Data

Jul. 14, 2022 (KR) .................. 10-2022-0087018

(51) Int. Cl.
*F24F 13/078* (2006.01)
*B01D 46/42* (2006.01)

(52) U.S. Cl.
CPC ........ *F24F 13/078* (2013.01); *B01D 46/4254* (2013.01)

(58) Field of Classification Search
CPC ........ F24F 13/078; F24F 8/80; B01D 46/4254
See application file for complete search history.

(56) References Cited

U.S. PATENT DOCUMENTS

| 8,414,670 | B2 | 4/2013 | Lee | |
| 2011/0037368 | A1* | 2/2011 | Huang | F21V 29/507 |
| | | | | 313/46 |
| 2015/0108364 | A1* | 4/2015 | Hanai | F24F 13/062 |
| | | | | 415/121.3 |
| 2015/0231542 | A1 | 8/2015 | Wennerstrom et al. | |
| 2015/0273376 | A1 | 10/2015 | Sohn et al. | |
| 2017/0122583 | A1* | 5/2017 | Lee | F24F 6/04 |

(Continued)

FOREIGN PATENT DOCUMENTS

| CN | 101808712 | 8/2010 |
| CN | 206944336 | 1/2018 |

(Continued)

OTHER PUBLICATIONS

Extended European Search Report dated Nov. 16, 2023 issued in Application No. 23185149.4.

(Continued)

*Primary Examiner* — Evan P Dzierzynski
(74) *Attorney, Agent, or Firm* — KED & ASSOCIATES, LLP

(57) ABSTRACT

The present disclosure relates to an air purifier. An air purifier according to an aspect of the present disclosure may include: a first body having an inlet and an outlet; a fan; a second body coupled to the first body, having a central portion located above the first body, and extending from the central portion in a direction crossing the up-and-down direction; a substrate; a light source disposed at the central portion or at a position corresponding to the central portion in the up-and-down direction; and a light guide facing the light source, and extending in a direction away from the central portion, so it is possible to minimize the number of the light sources and deliver light to an outside of the air purifier.

20 Claims, 19 Drawing Sheets

(56) References Cited

U.S. PATENT DOCUMENTS

| | | | |
|---|---|---|---|
| 2017/0248153 A1* | 8/2017 | Park | ............... B01D 46/58 |
| 2018/0001248 A1 | 1/2018 | Jung et al. | |
| 2019/0226698 A1 | 7/2019 | Kim et al. | |
| 2020/0289968 A1 | 9/2020 | Scholten et al. | |
| 2020/0298160 A1 | 9/2020 | Jeon et al. | |
| 2020/0298165 A1 | 9/2020 | Kang et al. | |
| 2021/0207847 A1 | 7/2021 | Lee et al. | |
| 2021/0387125 A1 | 12/2021 | Scholten et al. | |
| 2022/0032222 A1 | 2/2022 | Park et al. | |
| 2022/0154953 A1 | 5/2022 | Herskovitz et al. | |
| 2022/0184542 A1 | 6/2022 | Kim et al. | |
| 2022/0184543 A1 | 6/2022 | Choi et al. | |

FOREIGN PATENT DOCUMENTS

| | | |
|---|---|---|
| CN | 109405123 | 3/2019 |
| CN | 210624810 | 5/2020 |
| CN | 112013489 | 12/2020 |
| CN | 113623807 | 11/2021 |
| CN | 113465085 | 12/2021 |
| CN | 216409243 | 4/2022 |
| CN | 114484709 | 5/2022 |
| CN | 114521224 | 5/2022 |
| CN | 114526534 | 5/2022 |
| CN | 216744764 | 6/2022 |
| EP | 3832217 | 6/2021 |
| GB | 2286978 | 9/1995 |
| JP | 2006-320447 | 11/2006 |
| JP | 2022-025054 | 2/2022 |
| KR | 10-2016-0025975 | 3/2016 |
| KR | 10-1652363 | 9/2016 |
| KR | 10-2017-0131734 | 11/2017 |
| KR | 10-2018-0065164 | 6/2018 |
| KR | 10-1867084 | 6/2018 |
| KR | 10-2019-0119564 | 10/2019 |
| KR | 10-2020-0004167 | 1/2020 |
| KR | 10-2139575 | 7/2020 |
| KR | 20-2020-0002055 | 9/2020 |
| KR | 10-2020-0111895 | 10/2020 |
| KR | 10-2021-0105856 | 8/2021 |
| KR | 10-2289453 | 8/2021 |
| KR | 10-2021-0110427 | 9/2021 |
| KR | 10-2021-0137720 | 11/2021 |
| KR | 10-2021-0140930 | 11/2021 |
| KR | 10-2022-0007363 | 1/2022 |
| KR | 10-2022-0007993 | 1/2022 |
| KR | 10-2022-0018766 | 2/2022 |
| KR | 10-2022-0018994 | 2/2022 |
| KR | 10-2022-0059885 | 5/2022 |
| KR | 10-2022-0076876 | 6/2022 |
| WO | WO 2017/074128 | 5/2017 |
| WO | WO 2017/146353 | 8/2017 |
| WO | WO 2018/016883 | 1/2018 |
| WO | WO 2021/246949 | 12/2021 |
| WO | WO 2021/246950 | 12/2021 |

OTHER PUBLICATIONS

European Search Report dated Feb. 13, 2024, issued in Application No. 23201527.1.
European Search Report dated Feb. 13, 2024, issued in Application No. 23202298.8.
Korean Office Action dated Apr. 21, 2024, issued in Application No. 10-2022-0128429.
Korean Office Action dated Apr. 21, 2024, issued in Application No. 10-2022-0130152.
European Search Report dated Dec. 7, 2023, issued in Application No. 23185181.7.
European Search Report dated Dec. 8, 2023, issued in Application No. 23185189.0.
European Search Report dated Nov. 28, 2023, issued in Application No. 23185161.9.
European Search Report dated Dec. 1, 2023, issued in Application No. 23185203.9.
European Search Report dated Dec. 4, 2023, issued in Application No. 23185183.3.
European Search Report dated Dec. 13, 2023 issued in Application No. 23185155.1.
European Search Report dated Dec. 7, 2023, issued in Application No. 23185186.6.
Korean Office Action dated Mar. 22, 2024 issued in Application No. 10-2022-0087011.
Korean Office Action dated Mar. 22, 2024 issued in Application No. 10-2022-0087010.
Korean Office Action dated Mar. 19, 2024, issued in Application No. 10-2022-0087012.
Korean Office Action dated Mar. 19, 2024, issued in Application No. 10-2022-0087014.
U.S. Appl. No. 18/221,031, filed Jul. 12, 2023.
U.S. Appl. No. 18/221,067, filed Jul. 12, 2023.
U.S. Appl. No. 18/221,110, filed Jul. 12, 2023.
U.S. Appl. No. 18/221,152, filed Jul. 12, 2023.
U.S. Appl. No. 18/221,200, filed Jul. 12, 2023.
U.S. Appl. No. 18/221,540, filed Jul. 13, 2023.
U.S. Appl. No. 18/221,556, filed Jul. 13, 2023.
U.S. Appl. No. 18/221,576, filed Jul. 13, 2023.
U.S. Appl. No. 18/221,589, filed Jul. 13, 2023.
U.S. Appl. No. 18/377,447, filed Oct. 6, 2023.
U.S. Appl. No. 18/378,256, filed Oct. 10, 2023.

* cited by examiner

AIR PURIFIER

CROSS-REFERENCE TO RELATED APPLICATION(S)

This application claims priority from Korean Patent Application No. 10-2022-0087018, filed in Korea on Jul. 14, 2022, in the Korean Intellectual Property Office, the disclosure of which is incorporated herein by reference in its entirety.

BACKGROUND

1. Field

An air purifier, more particularly, to an air purifier emitting light to the outside is disclosed herein.

2. Background

An air purifier is a device that purifies introduced air and supplies the purified air. An air purifier typically includes a fan that introduces air into a case and a filter that filters foreign substances contained in the air introduced by the fan. The air purifier may include a display to indicate, for example, a fan driving state, an indoor air quality state, a filter clogging state, and/or a filter replacement cycle.

Recently, there has been an increasing demand for air purifiers in which an air flow passage is formed to output air in all directions of 360 degrees around of the air purifiers through an outlet formed along the entire circumference of the air purifiers. In the case of such air purifiers, since a part of the air purifier exposed to users varies depending on the installation location, air purifiers output information on the driving state of the air purifier in all directions of 360 degrees.

In addition, as the size of air purifiers increases, there is increasing need for a technology for diffusing light in all directions of 360 degrees with a small number of light sources and at the same time evenly diffusing light from the center of the air purifier toward the outside. However, in conventional air purifiers, there was problems that a structure to evenly diffuse light in the circumferential direction of the air purifier was absent, and the number of light sources to transmit light to the outside of the air purifier is excessively high.

Examples of air purifiers are provided in Korean Patent No. KR 10-2139575 and in Korean Published Patent Application No. KR 10-2021-0105856, the contents of which are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
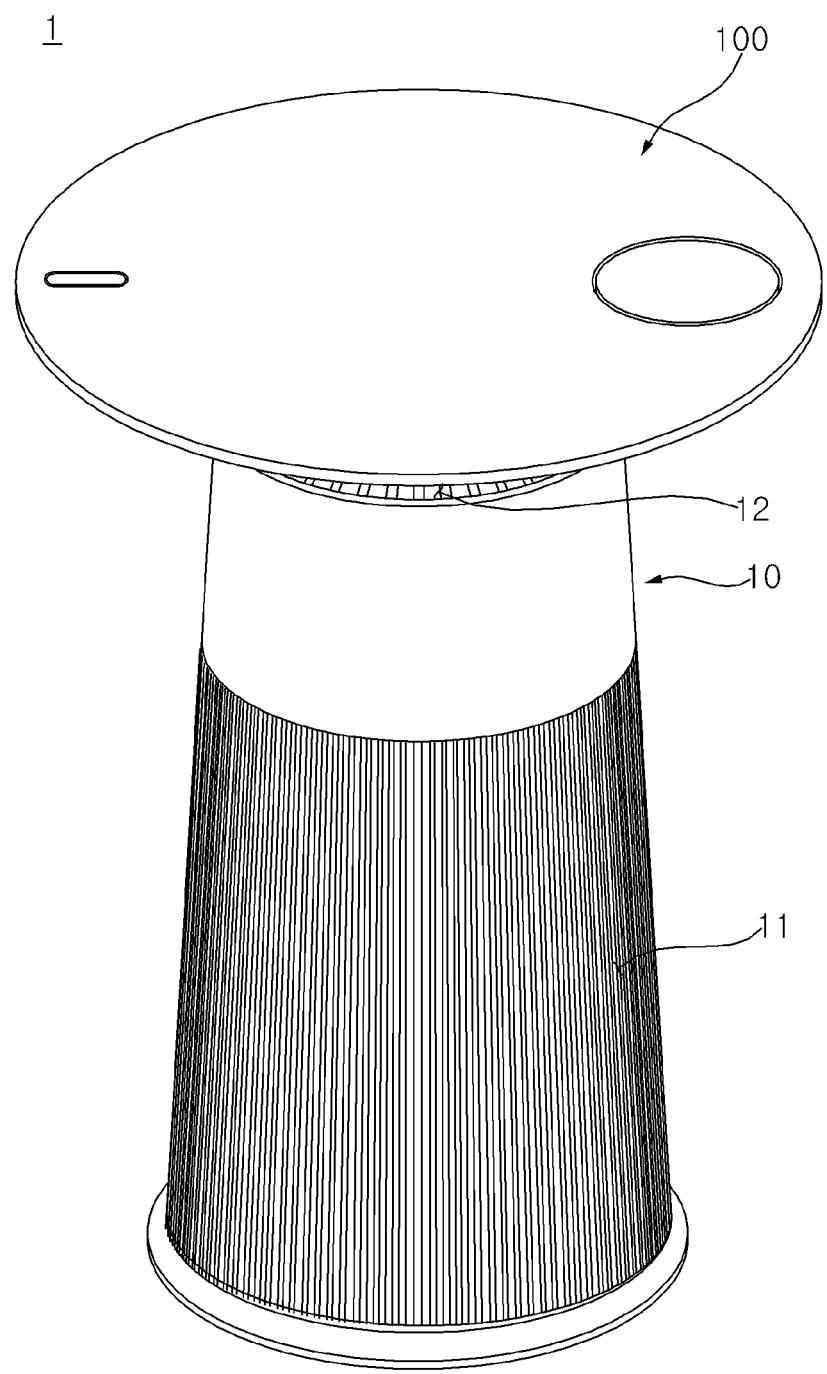
FIG. 1 is a perspective view of an air purifier according to an embodiment of the present disclosure.

Description will now be given in detail according to exemplary embodiments disclosed herein, with reference to the accompanying drawings. For the sake of brief description with reference to the drawings, the same or equivalent components are provided with the same or similar reference numerals, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another. As used herein, a singular representation is intended to include a plural representation unless the context clearly indicates otherwise.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

Hereinafter, an air purifier 1 will be described with reference to FIG. 1, and FIG. 1. is a perspective view showing an overall appearance of an air purifier 1. The air purifier 1 may include a first body 10. The first body 10 may have a substantially cylindrical shape. The first body 10 may have a space therein. The first body 10 may be disposed at a lower part of the air purifier 1.

The first body 10 may include an inlet 11. The inlet 11 may be defined along at least a portion of a circumferential surface of the first body 10. The inlet 11 may allow the inside of the first body 10 to communicate with indoor space. Air from outside of the air purifier 1 may be introduced into the inside of the first body 10 through the inlet 11.

The first body 10 may include an outlet 12. The outlet 12 may be defined on an upper part of the first body 10. The outlet 12 may be opened upward. Air inside the first body 10 may be discharged upward through the outlet 12.

The air purifier 1 may include a second body 100. The second body 100 may include a space therein. The second body 100 may be disposed above the first body 10. The second body 100 may be coupled with the upper part of the first body 10. The second body 100 may face the outlet 12 in an up-and-down direction. A lower surface of the second body 100 may be spaced apart upward from the outlet 12.

The second body 100 may function as a table. An upper surface to the second body 100 may include a substantially flat surface. Users may place things on the upper surface of the second body 100. The second body 100 may cover an upper side of the outlet 12.

Figure 2:
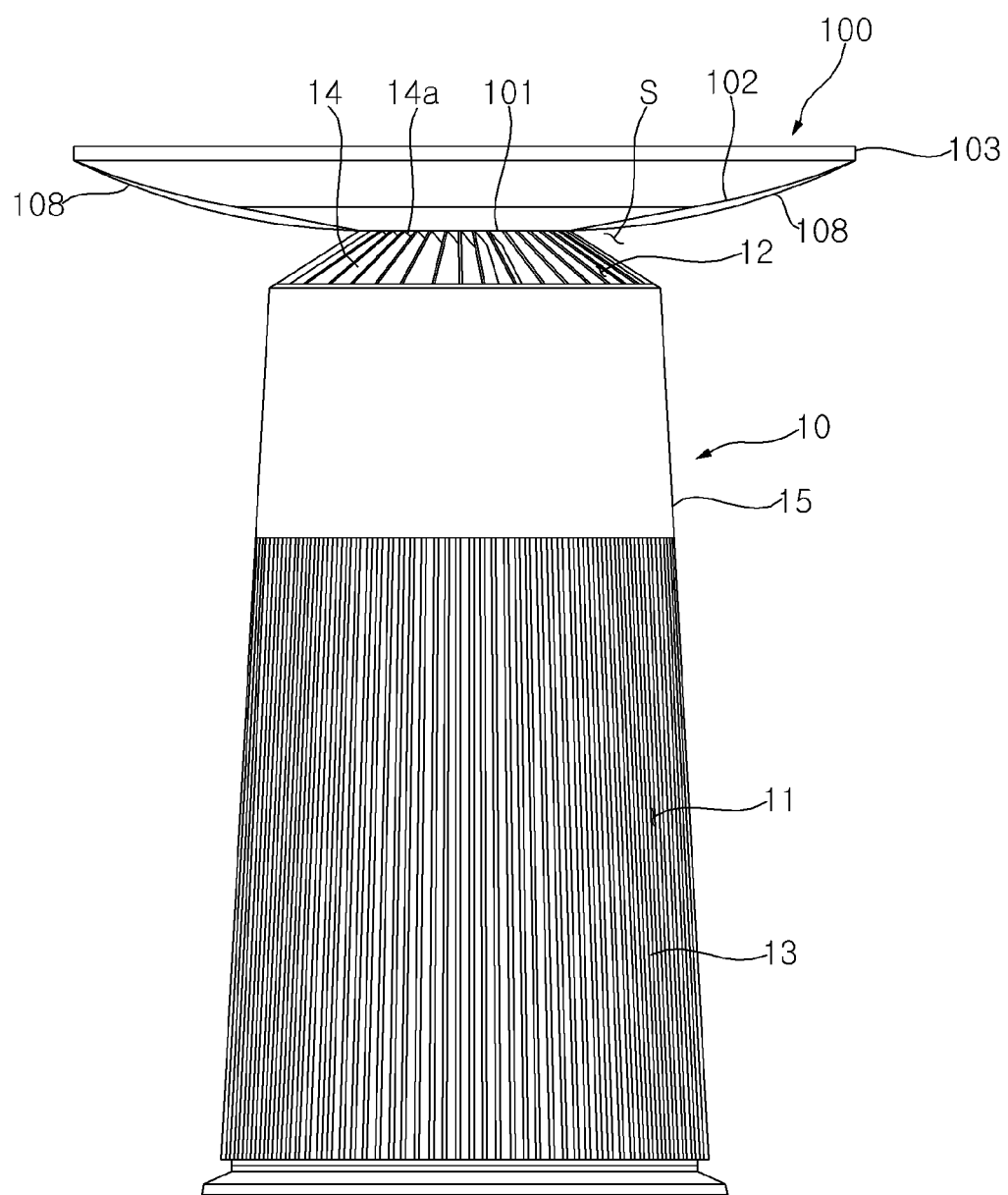
FIG. 2 is a front view of the air purifier according to an embodiment of the present disclosure.

Hereinafter, aspects of the air purifier 1 will be described with reference to FIG. 2, and FIG. 2. is a front view of the air purifier 1. The air purifier 1 may include an inlet grille 13. The inlet grille 13 may be detachably coupled to the first body 10. The inlet grille 13 may extend along at least a portion of a circumference of the first body 10. The inlet 11 may be defined on openings in the inlet grille 13.

The air purifier 1 may include an outlet grille 14. The outlet grille 14 may be detachably coupled to the first body 10. The outlet grille 14 may be disposed above the first body 10. The outlet 12 may be defined on openings of the outlet grille 14.

The air purifier 1 may include an outer wall 15. The outer wall 15 may define an outer circumferential surface of the first body 10. The inlet grille 13 may be detachably coupled to a lower region of the outer wall 15. The outlet grille 14 may be detachably coupled to an upper region of the outer wall 15.

The second body 100 may include a boundary portion (or boundary region) 101. The boundary portion 101 may be located above the outlet grille 14. The boundary portion 101 may extend in a circumferential direction along direction that the outlet 12 extends. The boundary portion 101 may refer to an area where the outlet grille 14 (or other upper portion of the first body 10, such as a mount 19 to be described below with respect to FIG. 3) and the second body 100 are in contact.

The second body 100 may include a lower wall 102. The lower wall 102 may be spaced apart upward from the outlet grille 14. The lower wall 102 may extend obliquely upward from the boundary portion 101. The lower wall 102 may be defined in a substantially annular shape along a direction that the outlet 12 extends. A discharge space S may be defined between the outlet 12 and the lower wall 102. The lower wall 102 may face the outlet 12 in the up-and-down direction, and the discharge space S may refer to a space defined between the lower wall 102 and the outlet 12.

The second body 100 may include an edge 103. The edge 103 may define an end portion of the lower wall 102. The edge 103 may extend along circumference of the second body 100.

The outlet grille 14 may include a grille top 14a. The grille top 14a may be spaced apart upward from the outer wall 15. The grille top 14a may extend circumferentially along a direction in which the outlet 12 extends. The grille top 14a may be in contact with the boundary portion 101. The grille top 14a may correspond to the boundary portion 101 in the up-and-down direction. A sealing member may be disposed between the grille top 14a and the boundary portion 101.

The lower wall 102 may be inclined upward toward an outside of the air purifier 1 in a radial direction. The lower wall 102 may be inclined upward in a direction away from the outlet 12.

The outlet grille 14 may be inclined upward toward an inside of the air purifier 1 in an inward radial direction. The outlet grille 14 may be inclined upward toward central portion (e.g., a center axis) of the first body 10. The outlet grille 14 may be inclined at an inclination angle θ2 with respect to the horizontal direction associated with a horizontal plane extending through grille top 14a and boundary portion 101.

The lower wall 102 and the outlet grille 14 may be inclined in opposing directions. For example, the lower wall 102 may be inclined upward toward an outer side of the air purifier 1 in an outward radial direction, and the outlet grille 14 may be inclined upward toward inner side of the air purifier 1 in an inward radial direction.

The edge 103 may be located further out in a horizontal direction from a center axis of the air purifier 1 than the first body 10. The edge 103 may be located further out in a horizontal direction from the center axis of the air purifier 1 than an outer edge of the outlet 11.

The air purifier 1 may include a guide rib 108. The guide rib may extend from the lower wall 102. The guide rib 108 may extend in a radial direction from grille top 14a and boundary portion 101 and may extend at least a portion of a distance between grille top 14a and boundary portion 101 and the edge 103. Discharged air through the outlet 12 may flow to the edge 103 along the guide rib 108.

Hereinafter, aspects of the air purifier 1 will be described with reference to FIG. 3, and FIG. 3. is a section view of the air purifier 1 cut in a vertical direction. The air purifier 1 may include a filter 16. The filter 16 may be disposed inside the first body 10. The filter may face the inlet grille 13. The filter 16 may filter out foreign substances contained in air introduced through the inlet 11. A shape of the filter 16 may correspond to a shape of the inlet 11. For example, the filter 16 may have a substantially cylindrical shape.

The air purifier 1 may include a fan 17. The fan 17 may be disposed inside a space of the first body 10. The fan 17 may be disposed radially within or above the filter 16. The fan 17 may generate a suction force to introduce outside air of the air purifier 1 through the inlet 11. The fan 17 may blow the introduced air upward. The air purifier 1 may include a fan motor 17a, and the fan motor 17a may rotate the fan 17.

The air purifier 1 may include a housing 18. The housing 18 may be disposed to surround the fan motor 17a. The housing 18 may be disposed inside the first body 10. The housing 18 may be spaced apart radially inward of the outer wall 15 to define an air flow passage to outlet 12. The housing 18 may located above the fan 17.

The housing 18 may include a first housing wall 18a. The first housing wall 18a may extend in up-and-down direction. The first housing wall 18a may be located above the fan 17.

The housing 18 may include a second housing wall 18b. The second housing wall 18b may extend in the up-and-down direction. The second housing wall 18b may be spaced apart radially inward from the outer wall 15. The second housing wall 18b may extend upward from the first housing wall 18a. An upper portion of a discharge passage to outlet 12 (see FIG. 6) may be defined between the second housing wall 18b and the outer wall 15. The second housing wall 18b may be inclined in the up-and-down direction. The second hosing wall 18b may be inclined toward the second body 100. The second housing wall 18b may be inclined radially inward of the first body 10. The second housing wall 18b may be inclined in a direction away from the outer wall 15.

The air purifier 1 may comprise a diffuser 18c. The diffuser 18c may be disposed between the outer wall 15 and the housing 18. The diffuser may extend in the up-and-down direction. The diffusers 18c may be arranged in a plurality to spaced apart from each other in a circumferential direction of the first body 10. The diffuser 18c may be disposed above the fan 17. The diffuser 18c may guide a flow direction of air blown by the fan 17 upward. The diffuser 18c may guide air blown by the fan 17 toward a discharge passage to outlet 12.

The air purifier 1 may include a mount 19. The mount 19 may be disposed inside the first body 10. The mount may be coupled to an upper part of the housing 18. A section (e.g., lower body 110) of the second body 100 may be coupled to the mount 19. The second body 100 may be detachably coupled to upper side of the mount 19. A section of the second body 100 may be inserted into the mount 19 and fixed to the mount 19.

The second body 100 may include a lower body (or post) 110. The lower body 110 may define a lower part of the second body 100. The lower body 110 may have a substantially cylindrical shape or other shape to be received within mount 19. The lower body 110 may extend in the up-and-down direction. The lower body 110 may be coupled to the mount 19. A diameter of the lower body 110 may be smaller than a diameter of the outer wall 15. The lower body 110 may be inserted toward inside the first body 10 and coupled to the first body 10.

The second body 100 may include an upper body 120. The upper body 120 may be disposed above the lower body 110. The upper body may be integrally coupled to the lower body 110. The upper body 120 may extend radially outward from the air purifier 1. A diameter of the upper body 120 may be larger than a diameter of the lower body 110. A section of the upper body 120 may be located above the outlet 12. The boundary portion 101 may be defined between the lower body 110 and the upper body 120.

The second body 100 may include a top cover 130. The top cover 130 may be disposed above the upper body 120. The top cover 130 may have a substantially flat upper surface to provide a table top region to receive items from a user.

Air introduced into the first body 10 through the inlet grille 13 may be blown upward by the fan 17 after passing through the filter 16. Air blown upward may pass though the outlet 12 and flow to the discharge space S through the outlet 12. Air discharged to the discharge space S may flow toward outside of the air purifier 1 along the lower wall 12. Here, the housing walls 18a, 18b and the diffuser 18c may guide air blown by the fan 17 upward. In addition, the inclined outlet grille 14 and the lower wall 102 may guide the flow direction of air discharged from the outlet 12.

The second body 100 may include "a central portion" or central region. The central portion of the second body 100 may located above the first body 10. The central portion may refer to a portion of the second body 100 located at an upper side of the first body 10. The central portion may refer to a portion of the second body 100 located within an imaginary wall extending upward from an outer edge of the annular outlet grille 14. The central portion may refer to a portion of the upper body 120 coupled to the lower body 110, and located directly above an upper portion of the lower body 110.

Figure 4:
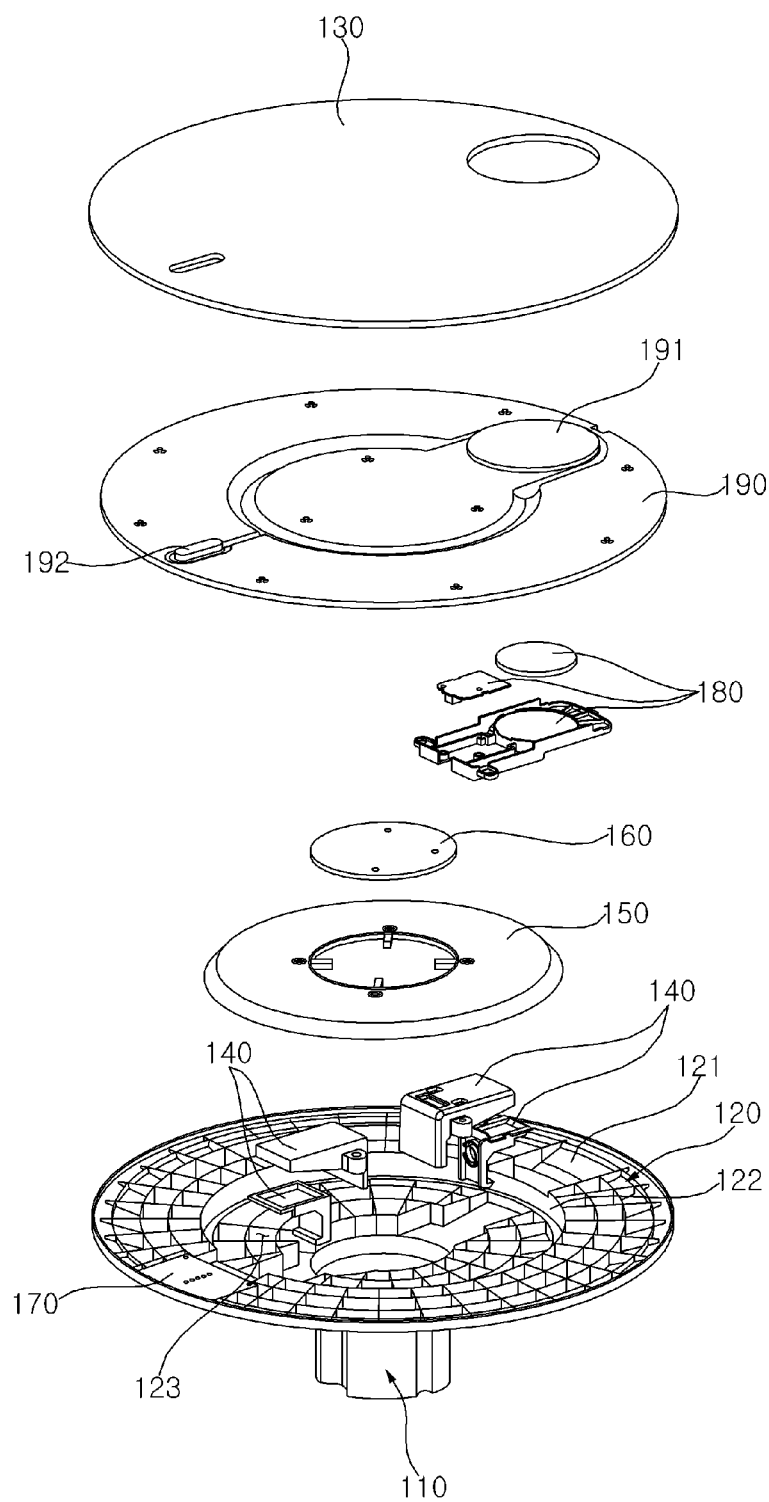
FIG. 4 is an exploded view of a part of the air purifier according to an embodiment of the present disclosure.

Hereinafter, aspects of the air purifier 1 will be described with reference to FIG. 4, and FIG. 4. is an exploded view of the second body 100. The second body 100 may include the lower body 110. The lower body 110 may have a substantially cylindrical shape or other shape extending in the up-and-down direction. The lower body 110 may be coupled to the first body 10.

The second body 100 may include the upper body (or upper frame) 120. The upper body 120 may have an annular shape. A space may be defined inside the upper body 120. A diameter of the upper body 120 may be greater than a diameter of the lower body 110. The upper body 120 may extend radially outward from the lower body 110. The lower body 100 and the upper body 120 may be integrally formed.

The upper body 120 may include a plate 121. The plate may have an annular shape. A lower wall 102 may be disposed below the plate 121. The lower wall 102 may refer to a lower part of the plate 121.

The upper body 120 may include a step portion (or step wall) 122. The step portion 122 may be bent to extend downward from the plate 121. The step portion 122 may be bent to extend toward the lower body 110.

The upper body 120 may include an accommodation space 123. The accommodation space 123 may be defined inside the plate 121. The accommodation space 123 may be defined above the lower body 110. The accommodation space 123 may be defined insider the step portion 122.

The second body 100 may include the top cover 130. The top cover 130 may have a substantially disk shape, an elliptical shape, an oval shape, or other shape corresponding to a top view of the second body 100. The top cover 130 may be coupled to upper side of the upper body 120. An upper surface of the top cover 130 may be a substantially flat surface to provide a receiving space for items placed by a user.

The second body 100 may include a coupling device 140 (also referred to as a hook or a coupler). The coupling device 140 may be disposed on the upper body 120. The coupling device 140 may be movably disposed within the accommodate space 123. The coupling device 140 may be disposed between the lower body 110 and the top cover 130. The coupling device 140 may be moved inside the upper body 120, and the second body 120 may be detached from the mount 19. The coupling device 140 may be a hook or a lever. A portion of the coupling device 140 may protrude downward from the lower wall 102 (see FIG. 3) and be operable to engage or release from the first body 10.

The second body 100 may include a light guide (or inner light guide) 150. The light guide 150 may be disposed on the upper body 120. The light guide 150 may be disposed within the accommodate space 123. The light guide 150 may diffuse light transmitted from a substrate 160 to the lower wall 102 (see FIG. 3).

The second body 100 may include the substrate (or light) 160. The substrate 160 may have a disk shape. The substrate 160 may receive power form external power source. The substrate may include a plurality of light sources 162 (see FIG. 7), such as light emitting diodes or incandescent bulbs. The plurality of light sources may be spaced apart from each other in the circumferential direction of the substrate 160. A plurality of light sources may face the light guide 150 in the up-and-down direction. The light guide 150 may diffuse light transmitted from the plurality of light sources toward the lower wall 102 (see FIG. 3). The substrate 160 may be disposed between the light guide 150 and the top cover 130. The substrate 160 may be disposed with the accommodate space 123 of the upper body 120.

The second body 100 may include a button assembly 170. The button assembly 170 may be disposed on the upper body 120. The button assembly 170 may be disposed on the plate 121. A portion of the button assembly 170 may protrude downward from the lower wall 102 (see FIG. 3). The button assembly 170 may be electrically connected to the fan 17 (see FIG. 3). A user can manipulate the button assembly 170 to adjust a driving state of the fan 17 (see FIG. 3).

The second body 120 may include a wireless charging device 180. The wireless charging device may be disposed on the upper body 120. The wireless charging device 180 may supply power to electronic devices. For example, the wireless charging device 180 may be an inductive charging device that uses electromagnetic induction to provide electricity to portable devices.

The second body 120 may include a top plate 190. The top plate 190 may be disposed between the top cover 130 and the upper body 120. The top plate 190 may have a disk shape. The top plate 190 may include a wireless charging portion (or wireless charging region) 191 electrically connected to the button assembly 170. The wireless charging portion 191 may be exposed on upper side of the top cover 130. The top plate 190 may include a display 192 electrically connected to the button assembly 170. The display 192 may be exposed on the upper side of the top cover 130. A user can charge an electric device by placing the electric device on the wireless charging portion 191 exposed on the upper side of the top cover 130. The user may check operating status of the air purifier 1 through the display 192 exposed on the upper side of the top cover 130.

Figure 5:
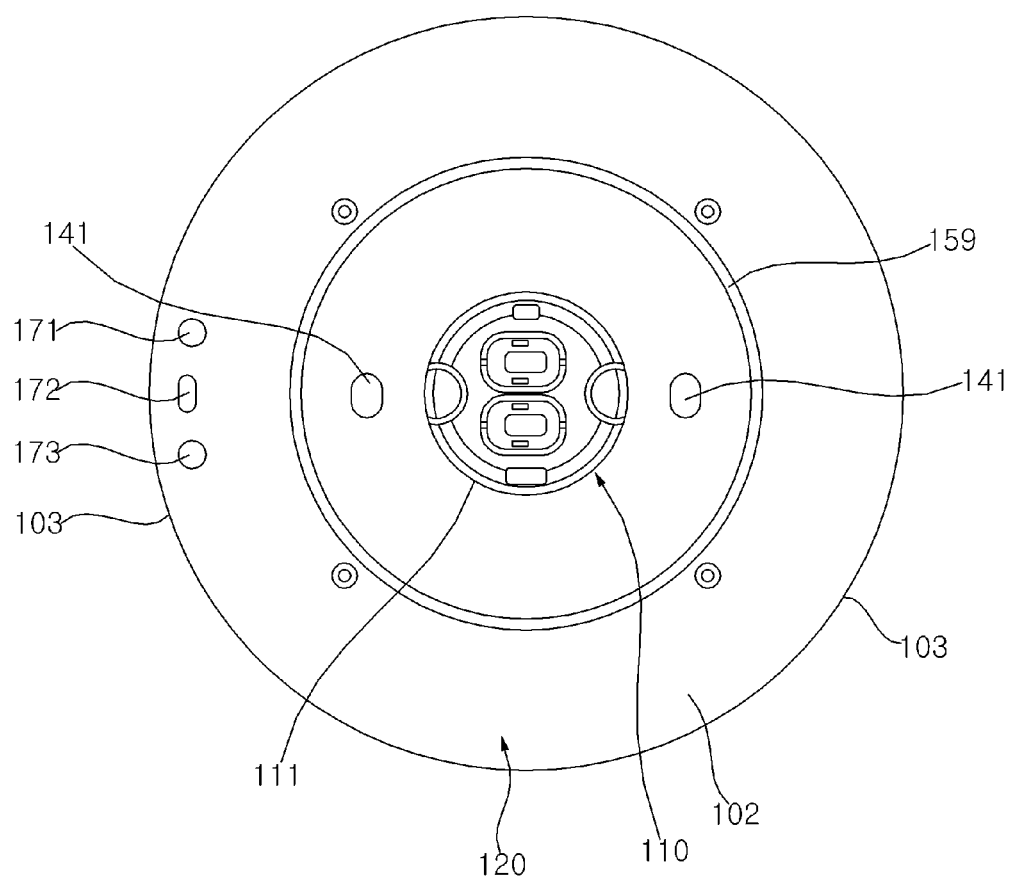
FIG. 5 is a view of another part of the air purifier according to an embodiment of the present disclosure.

Hereinafter, aspects of the air purifier 1 will be described with reference to FIG. 5. FIG. 5. is a bottom view of the second body 100. The lower body 110 may include an outer circumferential surface 111. The outer circumferential surface 111 may have a cylindrical shape.

The upper body 120 may include the lower wall 102. The lower wall 102 may extend radially outward from the outer circumferential surface 111 of the lower body 110. The lower wall 102 may have an annular shape. An outer diameter of the lower wall 102 may be greater than a diameter of the outer circumferential surface 111.

The edge 103 may be located at an end of the lower wall 102. The edge 103 may have an annular shape. The lower wall 102 may be located between the outer circumferential surface 111 and the edge 103. A diameter of the edge 103 may be greater than the diameter of the outer circumferential surface 111.

The second body 100 may include a coupling device button 141. The coupling device button 141 may be connected to the coupling device 140. The coupling device button may be exposed on lower side of the lower wall 102. A user may separate the second body 100 from the first body 10 by pressing the coupling device button 141, and the coupling device button may move the coupling device 140 to release from the first body 10. The coupling device button 141 may be recessed toward upper side of the lower wall 102. The coupling device button may be located outside of the lower body 110 in a radial direction.

The second body 100 may include a lamp (or outer light guide) 159. The lamp 159 may receive light from the light guide 150. The lamp 159 may be exposed on lower side of the lower wall 102. The lamp 159 may radiate light transmitted from the light guide 150 to the lower side of the lower wall 102. The lamp 159 may have an annular shape. The lamp may be located outside of the lower body 110 in the radial direction. A distance between the lamp 159 and an outer side surface of the lower body 110 may be greater than a distance between the coupling device button 141 and the lower body 110.

The second body 100 may include at least one of the first button 171, the second button 172, and the third button 173. The first to third buttons 171, 172, 173 may be connected to the button assembly 170. The first to third buttons 171, 172, 173 may be exposed on lower side of the lower wall 102. At least one of the first to third buttons 171, 172, 173 may have a different shape from another button 171, 172, 173. Some of the first to third buttons 171, 172, 173 may protrude downward from the lower wall 102. Some of the first to third buttons 171, 172, 173 may be recessed toward upper side of the lower wall 102. A user may manipulate the first to third buttons 171-173 exposed on lower side of the lower wall 102 to adjust operation of the air purifier 1 including the fan 17. The buttons 171, 172, 173 may be located outside of the lower body 110 in the radial direction. A distance between the buttons 171, 172, 173 and the lower body 110 may be greater than a distance between the buttons 171, 172, 173 and the coupling device button 141. A distance between the buttons 171, 172, 173 and the edge 103 may be smaller than a distance between the buttons 171, 172, 173 and the lower body 110.

The lamp 159 may be located radially between the buttons 171, 172, 173 and the coupling device button 141. The lower body 110 may be located inside the lamp 159 in a radial direction. The lamp 159 may be located between the edge 103 and the lower body 110.

Figure 6:
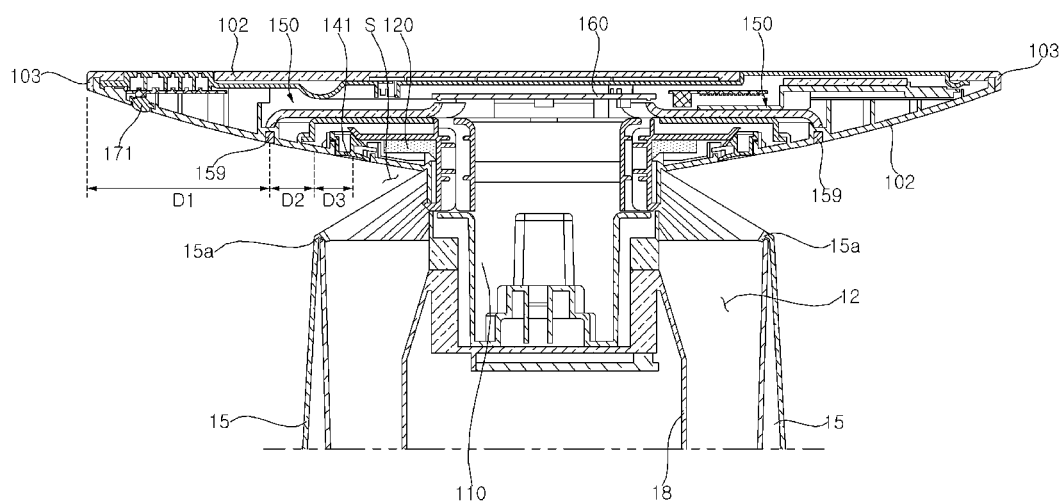
FIG. 6 is a part of a sectional view of the air purifier according to an embodiment of the present disclosure.

Hereinafter, aspects of the air purifier 1 will be described with reference to FIG. 6. FIG. 6. is a part of a sectional view of the air purifier 1 cut in the vertical direction. Air blown by the fan 17 may flow upward through between the housing 18 and the outer wall 15. The air blown by the fan 17 may be discharged into the discharge space S through the outlet 12. The air discharge into the discharge space S may flow along the lower wall 102 toward the edge 103.

The lamp 159 may be exposed on a lower side of the lower wall 102. The lamp 159 may emit light to a lower side of the second body 100. The lamp 159 may emit light to the lower side of the lower wall 102.

The lamp 159 may be located at an outside of the discharge space S. The lamp 159 may be located further radially outward than outer wall 15 of the first body 10. The lamp 159 may emit light toward an outside of the first body 10. Here, it is possible to prevent the light emitted from the lamp 159 from interfering with the first body 10.

The outer wall 15 of the first body 10 may include an outer wall upper end 15*a*. The outer wall upper end 15*a* may be coupled to the outlet grille 14. The outer wall upper end 15*a* may face the lower wall 102. The lamp 159 may be located further radially outward than the outer wall upper end 15*a*. The lamp 159 may be located between the outer wall upper end 15*a* and the edge 103 of the second body 100.

The substrate 160 generating light outputted by lamp 159 may be disposed between the top cover 130 and the light guide 150. The substrate 160 may be disposed inside the upper body 120.

The lamp 159 may be spaced apart outward from the outer wall upper end 15a. The lamp 159 may be space apart inward from the edge 103. The lamp 159 may be located between the button 171 and the coupling device button 141.

A horizontal distance D1 between the lamp 159 and the edge 103 may be greater than a horizontal distance D2 between the lamp 159 and the outer wall upper end 15a. The horizontal distance D1 between the lamp 159 and the edge 103 may be greater than a horizontal distance D3 between the outer wall upper end 15a and the coupling device button 141.

Figure 7:
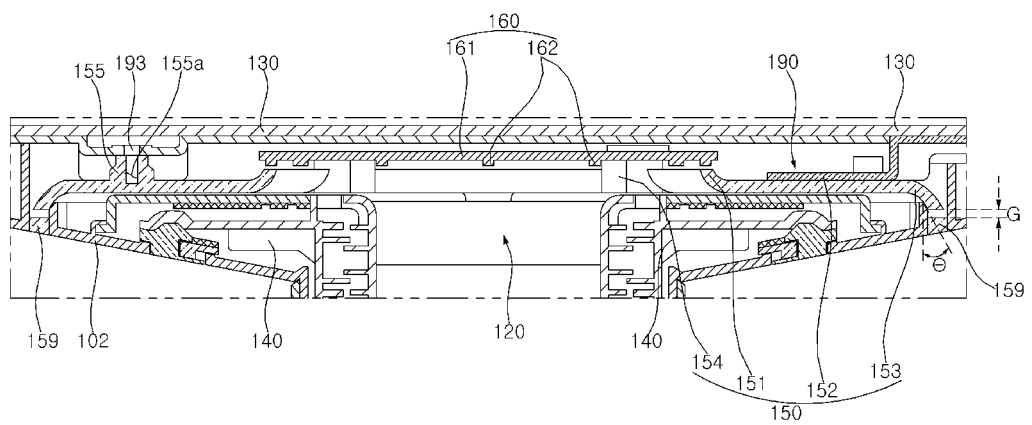
FIG. 7 is a part of a sectional view of the air purifier according to an embodiment of the present disclosure.

Hereinafter, aspects of the air purifier 1 will be described with reference to FIG. 7. FIG. 7. is a part of a section view of the air purifier 1 cut in the vertical direction. The light guide 150 may be located above the coupling device 140. The substrate 160 may be located above the coupling device 140. The substrate 160 may be located between the top cover 130 and the light guide 150.

The substrate 160 may include a substrate plate 161. The substrate plate 161 may have a disk shape. An electric circuit may be mounted on the substrate plate 161. The substrate plate 161 may receive power from an external power source. The substrate plate may be electrically connected to the fan 17 (see FIG. 3) and the fan motor 17a (see FIG. 3). The substrate plate 161 may receive electrical signals related to the driving of the fan 17 and the fan motor 17a.

The substrate 160 may include a light source 162. The light source 162 may emit light downward. A plurality of light sources 162 may be disposed spaced apart from each other in a circumferential direction of the substrate 160. The light source 162 may emit light to the light guide 150.

Figure 3:
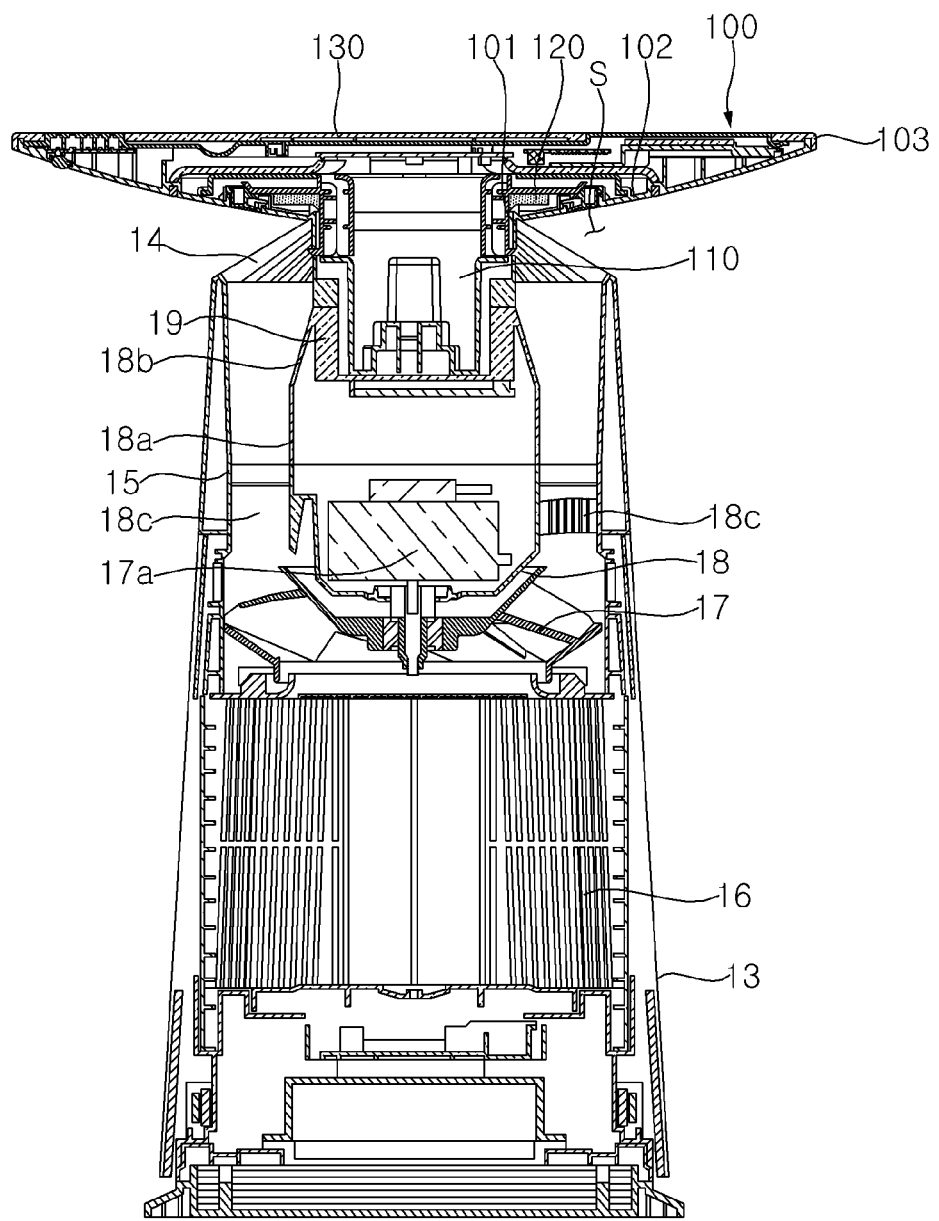
FIG. 3 is a sectional view of the air purifier according to an embodiment of the present disclosure.

The substrate plate 161 may control light emission of the light source 162 based on electrical signals related to the fan 17 (see FIG. 3) and the fan motor 17a (see FIG. 3). For example, the substrate plate 161 may control light emission of the light source according to rotation RPM of the fan 17. In another example, the substrate plate 161 may control color of the light emitted from the light source 162 differently when the fan 17 is driven and the when the fan 17 is stopped.

The light source 162 may protrude downward from the substrate plate 161. The light source 162 may protrude toward the light guide 150. The light source may emit light toward a light receiving portion (or light receiving surface) 151 of the light guide 150. The light source 162 may be configured to be detached from the substrate plate 161. The light source 162 may be mounted on the substrate plate 161.

In the air purifier according to an embodiment of the present disclosure, a plurality of the light sources spaced apart from each other along the circumference of the substrate plate 161 may emit light to an outside of the air purifier 1. Here, the plurality of light sources may be disposed toward an outside of the second body 100, and a surface of the second body 100 may be transparent.

The light guide 150 may include the light receiver (or light receiving region) 151. The light receiver 151 may extend along an up-and-down direction. The light receiver 151 may curvedly extend toward an outside of the second body 100 in radial direction. The light receiver 151 may extend toward the outside of the second body 100 in radial direction toward a lower side. The light receiver 151 may face the light source 162 in an up-and-down direction. The light receiver 151 may extend in a direction in which the plurality of light sources 162 are spaced apart from each other. The light receiver 151 may be spaced apart downward from the plurality of light sources 162.

The light guide 150 may include a light channel 152. The light channel may extend from the light receiver 151 to an outside of the second body 100 in radial direction. The light channel 152 may have an annular shape. The light channel 152 may located outside of the substrate 160. Light emitted from the light source 162 and transmitted to the light receiver 151 may proceed to an outside of the second body 100 through the light channel 152. The light channel 152 may be disposed between the top plate 190 and the coupling device 140.

The light guide 150 may include the light emit portion (or light emitting region) 153. The light emit portion 153 may be connected to the light channel 152. The light emit portion 153 may curvedly extend from the light channel 152 to a lower side. The light emit portion 153 may curvedly extend from an end portion of the light channel 152 to an outside of the second body 100. The light emit portion 153 may extend at an inclination angle θ with respect to a vertical direction. The light emit portion 153 may be inclined toward an outside of the second body 100 with respect to an up-and-down direction. The light emit portion 153 may face the lamp 159 in an up-and-down direction. Light proceeding through the light channel 152 may be irradiated to the lamp 159 through the light emit portion 153. The light emit portion 153 may be spaced apart from the lamp 159. A distance G may be defined between the light emit portion 153 and the lamp 159.

The light guide 150 may include the coupling rib 154. The coupling rib 154 may extend inward in a radial direction of the light guide 150. A plurality of the coupling ribs 154 may be spaced apart along a circumference of the light guide 150. The coupling rib 154 may face the substrate 160 in an up-and-down direction. The substrate 160 may be fastened to the coupling rib 154. The air purifier 1 may include a fastening member, such as a screw, penetrating the substrate plate 161 and the coupling rib 154.

The light guide 150 may include a guide protruding portion (or guide protrusion) 155. The guide protruding portion 155 may protrude upward from the light channel 152. The guide protruding portion 155 may include a fastening hole 155a. The fastening hole 155a may open in an up-and-down direction. The top plate 190 may include a boss 193 protruding downward. The boss 193 may be inserted into the fastening hole 155a. The top plate 190 may be fixed to the light guide 150 by inserting the boss 193 into the fastening hole 155a.

Figure 8:
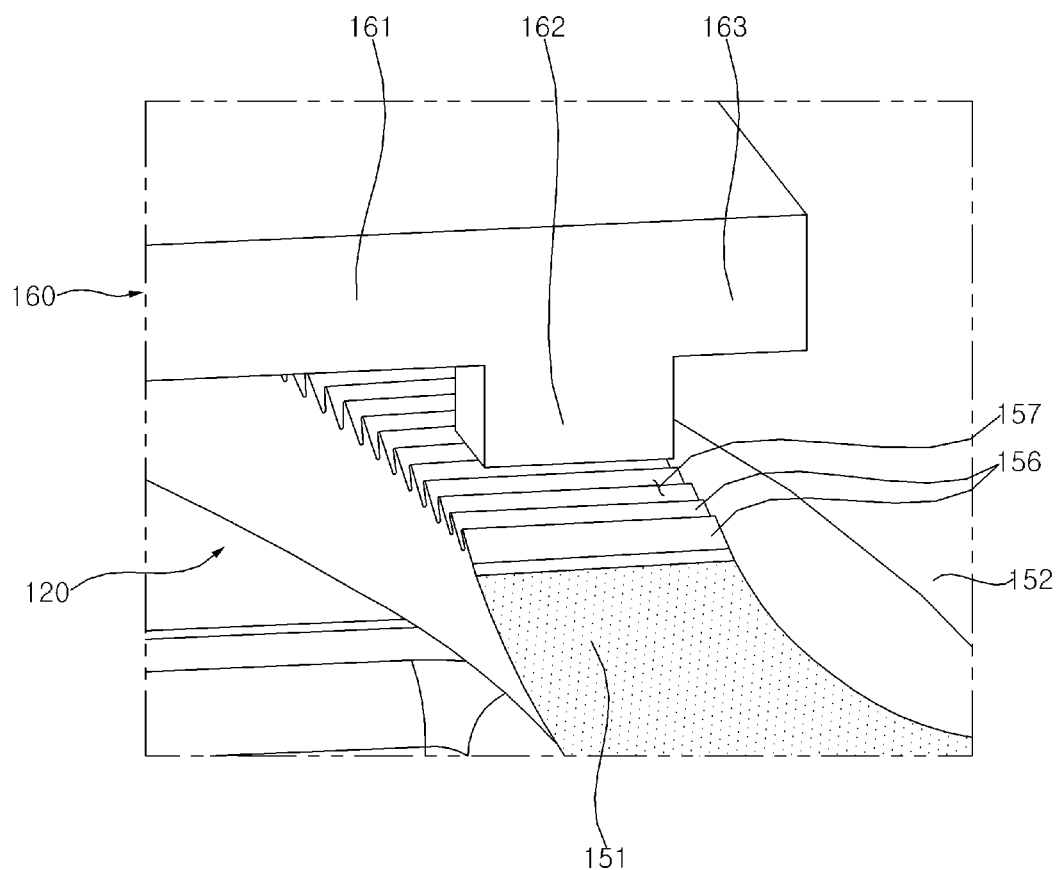
FIG. 8 is a view of a part of the air purifier according to an embodiment of the present disclosure.

Hereinafter, aspects of the air purifier 1 will be described with reference to FIG. 8. FIG. 8. is a view of a part of the light guide 150 and the substrate 160 cut away. The substrate plate 161 may be spaced apart upward from the light guide 150. The light source 162 may protrude from the substrate plate 161 toward the light receive portion 151 of the light guide 150.

The substrate 160 may include a substrate end portion (or substrate end region) 163. The substrate end portion 163 may be located an outside of the substrate plate 161 in a radial direction than the light source 162. The light source 162 may be spaced inward from an outermost side of the substrate plate 161 in a radial direction.

The light receive portion 151 may be spaced apart downward from the light source 162. The light source 162 may emit light toward the light receive portion 151. The light receive portion 151 may curvedly extend toward an outside of the substrate 160. The light receive portion 161 may extend downward. The light receive portion 151 may have an annular shape. The light receive portion 151 may extend annularly along a circumference of the substrate 160.

The light channel 152 may extend toward an outside of the substrate 160. The light channel 152 may have an annular shape.

The light guide 150 may be made of a material through which light is transmitted. In addition, an inner wall surface of the light guide 150 may be made of a material that reflects light. Light projected to the light receiver 151 may proceed toward an outside of the light guide 150 while being reflected on the inner wall surface of the light guide 150 inside the light receiver 151, the light channel 152, and the light emit portion 153.

The light guide 150 may include a light receive protrusion 156. The light receive protrusion 156 may protrude from the light receive portion 151 toward the light source 162. A plurality of the light receive protrusions 156 may be spaced apart from each other along a circumference of the light receive portion 151. A plurality of the light receive protrusions 156 may be space apart from each other along a circumference of the substrate 160.

The light guide 150 may include a gap 157. A gap 157 may be defined between a pair of a plurality of the light receive protrusions 156. A plurality of gaps 157 may be spaced apart from each other along a circumference of the light receive portion 151. The plurality of gaps may be space apart from each other along a circumference of the substrate 160. The light receive protrusion 156 and the gaps 157 may be alternately arranged along a circumference of the light receive portion 151.

The light receive protrusion 156 and the gap 157 may be spaced apart downward from the plurality of light sources 162 spaced apart along a circumference of the substrate 160. Light irradiated from the light source 162 may be projected toward the light receive protrusion 156 and the gap 157. Due to a shape of the light receive protrusion 156 and the gap 157, light irradiated from the light source 162 and projected to the light receive portion 151 may be easily diffused toward the light channel 152, and widely diffused in a circumferential direction of the light guide 150.

Figure 9:
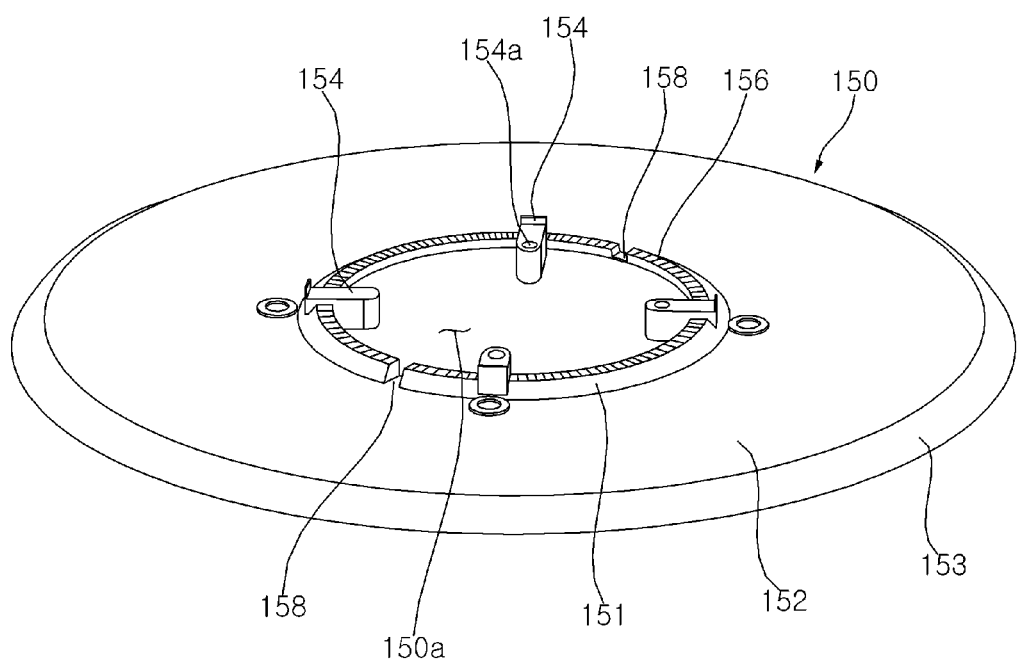
FIG. 9 is a view of a part of the air purifier according to an embodiment of the present disclosure.
Figure 10:
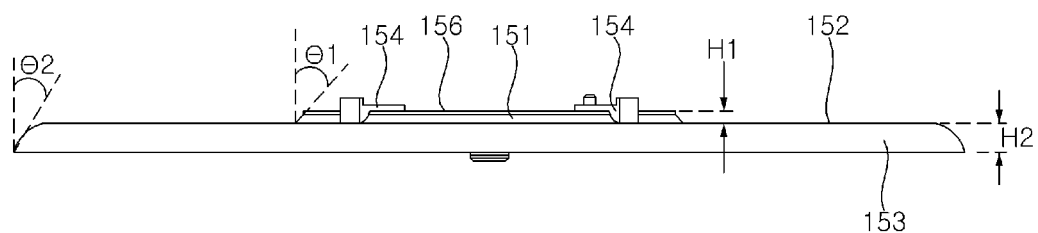
FIG. 10 is a view of a part of the air purifier according to an embodiment of the present disclosure.
Figure 11:
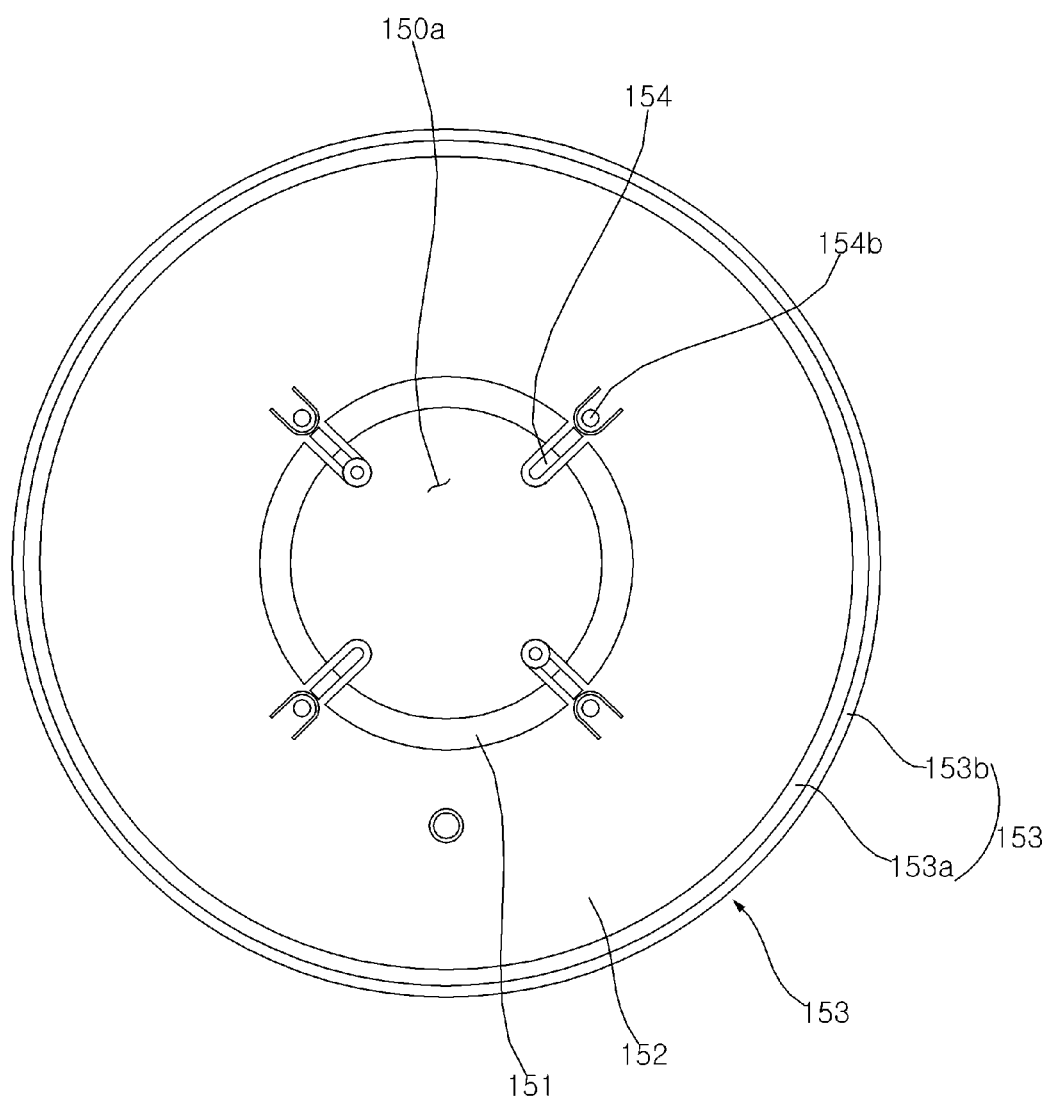
FIG. 11 is a view of a part of the air purifier according to an embodiment of the present disclosure.

Hereinafter, the air purifier 1 will be described with reference to FIGS. 9 to 11. FIG. 9. is a perspective view of the light guide 150, FIG. 10. is a front view of the light guide 150, and FIG. 11. is a bottom view of the light guide 150.

The light guide 150 may have an annular shape. The light guide 150 may include a hollow portion (or hollow region) 150a. The hollow portion 150a may be an empty space inside the light guide 150. The substrate 160 may be disposed above the hollow portion 150a. The hollow portion 150a may be surrounded by the light receive portion 151.

The coupling rib 154 may extend toward the hollow portion 150a. A plurality of coupling ribs 154 may be spaced apart from each other in a circumferential direction of the light guide 150. The coupling rib 154 may extend from the light receive portion 151 to the hollow portion 150a.

The coupling rib 154 may include a coupling hole 154a. the coupling hole 154a may open in an up-and-down direction. The light guide 150 and the substrate 160 may be coupled by a fastening member (not shown) penetrating the coupling hole 154a.

The light guide 150 may include a cut-off portion (or gap) 158. The cut-off portion 158 may formed by cutting a part of the light receiver 151. A plurality of cut-off portions may be spaced apart from each other along a circumference of the light receive portion 151. The cut-off portion 158 may be communicated with the hollow portion 150a. Some of the plurality of the coupling ribs 154 may be disposed on the cut-off portion 158.

The light receive portion 151 may protrude further upward than the light channel 152, and a height H1 may be defined between the light receive protrusion 156 and an upper surface of the light channel 152. The light emit portion 153 may protrude further downward than the light channel 152, and a height H2 may be defined between a lower surface of the light emit portion 153 and a upper surface of the light channel 152. The height H1 between the light receive protrusion 156 and the light channel 152 may be smaller than the height H2 between the light emit portion 153 and the light channel 152.

The coupling rib 154 may protrude further upward than the light channel 152. An upper end of the coupling rib 154 may located above the light receive protrusion 156.

The light receive portion 151 may be inclined outward in a radial direction of the light guide 150. The light receive portion 151 may have an inclination angle θ1 with respect to a vertical direction.

The light emit portion 153 may be inclined outward in a radial direction of the light guide 150. The light emit portion 153 may have an inclination angle θ2 with respect to vertical direction.

The light emit portion 153 may include a first light emit portion (or first light emitting region) 153a. The first light emit portion may be connected to the light channel 152. The first light emit portion 153a may be inclined outward in a radial direction of the light guide 150.

The light emit portion 153 may include a second light emit portion (or second light emitting region) 153b. The second light emit portion 153b may be connected to the first light emit portion 153a. The second light emit portion 153b may face the lamp 159 (see FIG. 7). Light projected to the light guide 150 may be irradiated to the lamp 159 through the second light emit portion 153b.

The coupling rib 154 may include a body fastening hole 154b. The body fastening hole 154b may be communicated with the coupling hole 154a (see FIG. 9). The second body 100 and the light guide 150 may be fastened each other by a fastening member penetrating the body fastening hole 154b.

Figure 12:
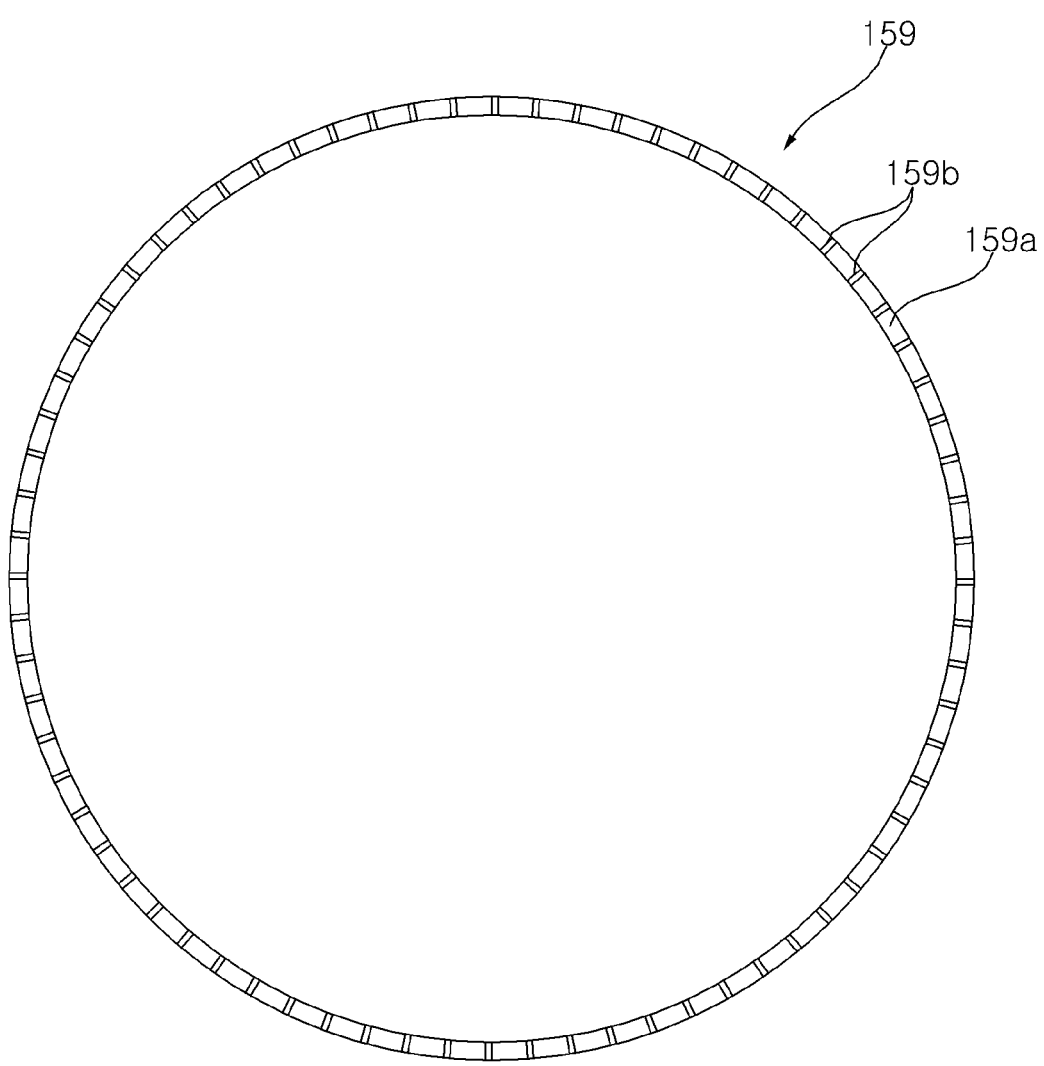
FIG. 12 is a view of a part of the air purifier according to an embodiment of the present disclosure.
Figure 13:
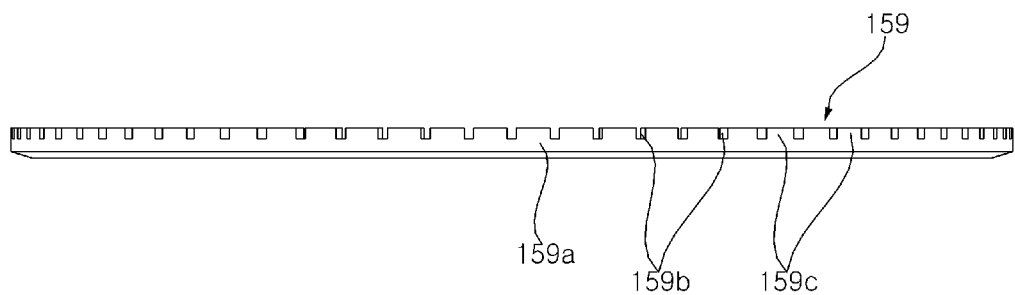
FIG. 13 is a view of a part of the air purifier according to an embodiment of the present disclosure.

Hereinafter, aspects of the air purifier 1 will be described with reference to FIGS. 12 and 13. FIG. 12. is a top view of the lamp 159, and FIG. 13. is a front view of the lamp 159.

The lamp 159 may have an annular shape when viewed from below. The lamp 159 may extend along a circumference of the light guide 150. The lamp 159 may be disposed below the second light emit portion 153b (see FIG. 11).

The lamp 159 may include a lamp body 159a. The lamp body 159a may have an annular shape. The lamp 159 may include a lamp groove 159b. The lamp groove 159b may be recessed downward from an upper surface of the lamp body 159a. A plurality of the lamp grooves 159b may be spaced apart from each other along a circumference of the lamp 159.

The lamp 159 may include a lamp protrusion 159c. The lamp protrusion 159c may be a portion of the lamp body 159a. The lamp protrusion 159c may be defined between the plurality of lamp grooves 159b. A plurality of lamp protrusions 159c may be spaced apart from each other along a circumference of the lamp 159.

The lamp groove 159b and the lamp protrusion 159c may be alternately arranged along a circumference of the lamp 159. The lamp groove 159b may be defined between a pair of the plurality of lamps protrusion 159c, and the lamp protrusion 159c may be disposed between a pair of the plurality of lamp grooves 159b.

Figure 14:
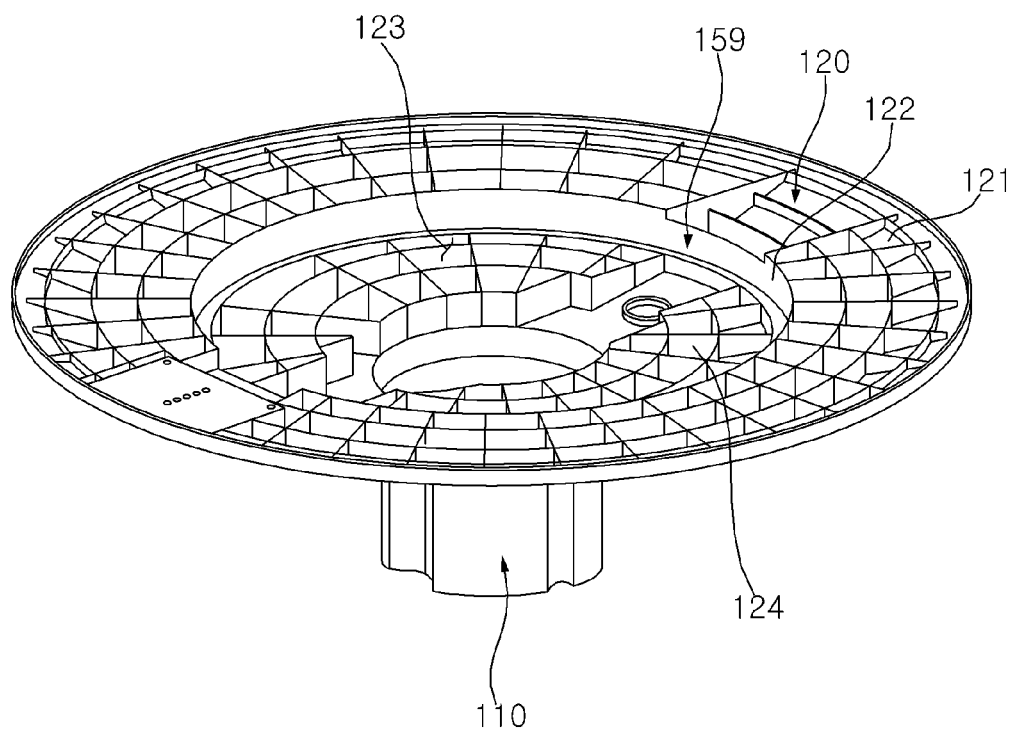
FIG. 14 is a view of a part of the air purifier according to an embodiment of the present disclosure.

Hereinafter, aspects of the air purifier 1 will be described with reference to FIG. 14. FIG. 14. is a view of the lower body 110 and the upper body 120 of the second body 100. The second body 100 may include the lower body 110 that is configured coupled to the first body 10. The second body 100 may include the upper body 120 disposed above the lower body 110.

The upper body 120 may include the plate (or outer plate) 121, the step portion 122, and the accommodation space 123. The upper body 120 may include a lower plate 124. The lower plate 124 may be connected to the step portion 122. The lower plate 124 may be spaced apart downward from the plate 121. The lower plate 124 may define a lower boundary of the accommodation space 123. The lower plate 124 may include a portion of the lower wall 102 (see FIG. 5).

The light guide 150 may be disposed within the accommodate space 123. The light guide 150 may be seated on the lower plate 124. The light guide 150 may be coupled to the lower plate 124.

The lamp 159 may be coupled to the lower plate 124. The lamp 159 may face the accommodate space 123. The lamp 159 may disposed below the step portion 122.

Figure 15:
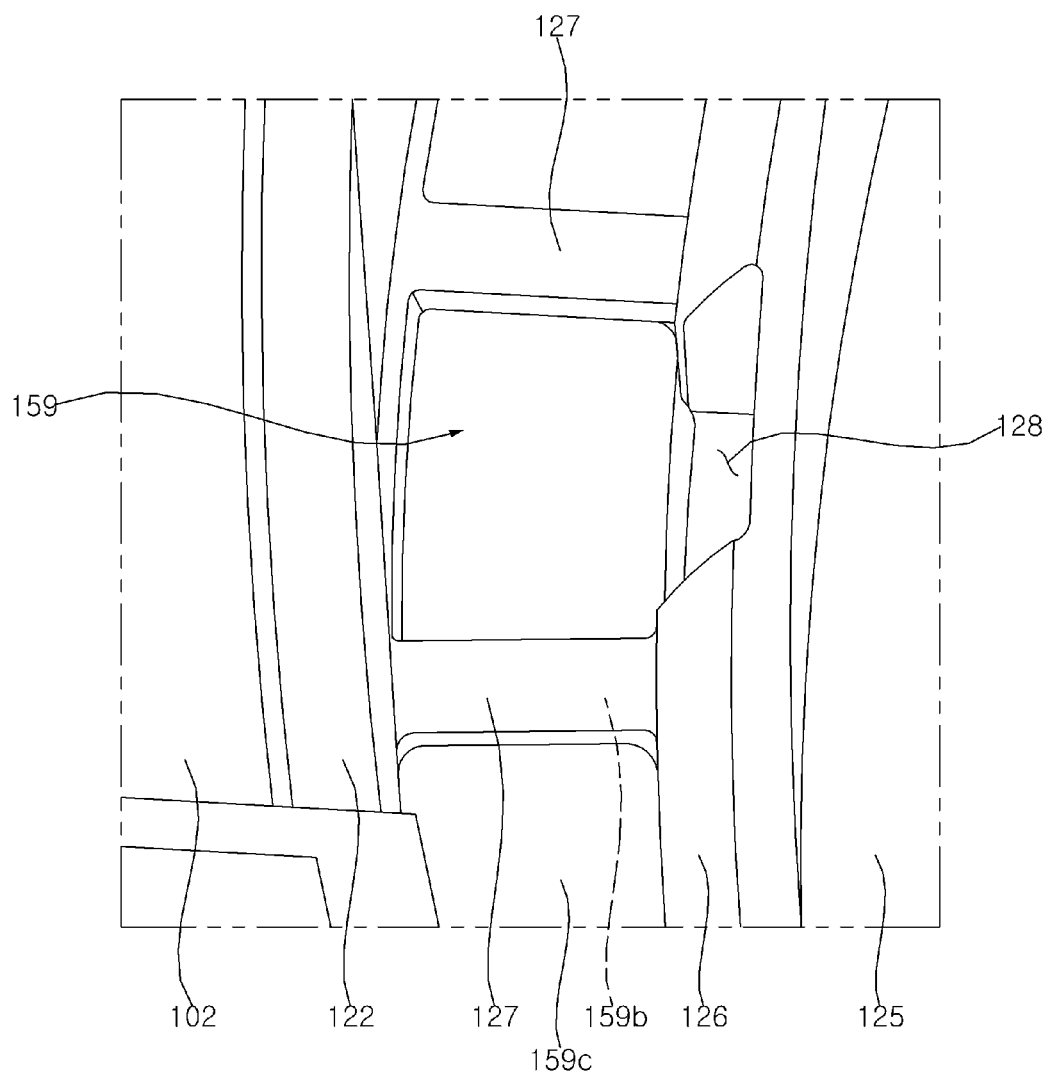
FIG. 15 is a view of a part of the air purifier according to an embodiment of the present disclosure.
Figure 16:
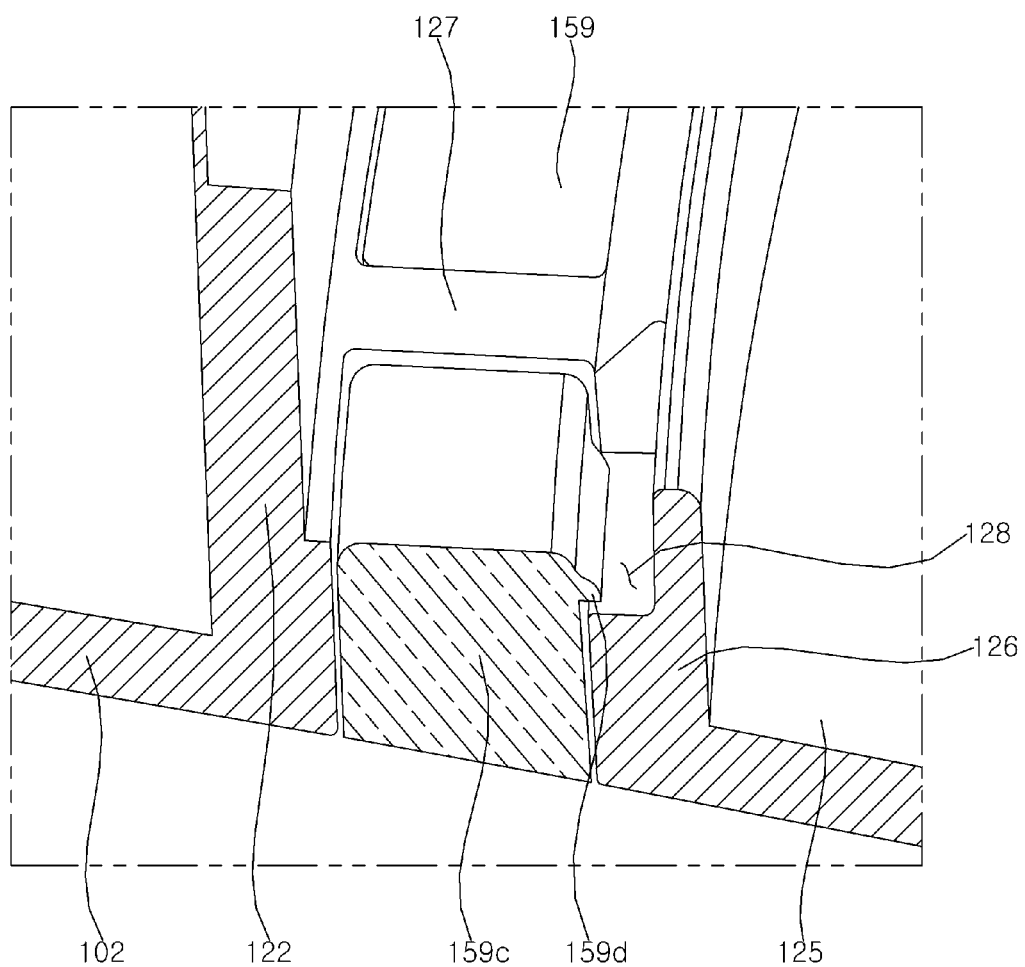
FIG. 16 is a view of a part of the air purifier according to an embodiment of the present disclosure.

Hereinafter, aspects of the air purifier 1 will be described with reference to FIGS. 15 and 16. FIG. 15. is an enlarged view of a form in which the lamp 159 is coupled to the upper body 120, and FIG. 16 is a cut away view of FIG. 15.

The second body 100 may include an inner wall 125. The inner wall 125 may be a portion of the lower plate 124 (see FIG. 14). The inner wall 125 may extend in a horizontal direction. The inner wall 125 may be located inside of the step portion 122.

The second body 100 may include a perimeter wall 126. The perimeter wall 126 may extend upward from the inner wall 125. The perimeter wall 126 may be a portion of the lower plate 124 (see FIG. 14). The perimeter wall 126 may be located inside of the step portion 122. The perimeter wall 126 may be space apart from the step portion 122.

The second body 100 may include a connecting rib 127. The connecting rib 127 may connect the perimeter wall 126 and the step portion 122. The connecting rib 127 may extend along a radial direction of the second body 100. The connecting rib 127 may be a portion of the lower plate 124 (see. FIG. 14). A plurality of connecting ribs 127 may be spaced apart from each other along a circumference of the second body 100.

The second body 100 may include a recess 128. The recess 128 may recessed into the perimeter wall 126. The recess 128 may recess toward the inner wall 125. The recess 128 may extend along a circumferential direction of the perimeter wall 126.

The lamp 159 may be disposed between the step portion 122 and the perimeter wall 126. The connecting rib 127 may be inserted into the lamp groove 129b. The lamp 159 may be fixed to the second body 100 by inserting the connecting rib 127 into the lamp groove 159b. The lamp protrusion 159c may be disposed between the plurality of the connecting ribs 127. The connecting rib 127 may be disposed between the plurality of lamp protrusion 159c.

The lamp 159 may include a hooking portion 159d. The hooking portion 159d may protrude from the lamp protrusion 159c. The hooking portion 159d may protrude toward the perimeter wall 126. The hooking portion 159d may be located inside the recess 128. The hooking portion 159d may be hooked to the perimeter wall 126 inside the recess 128.

The lamp 159 may be fixed to the second body 100 by inserting the connecting rib 127 into the lamp groove 159b and hooking the hooking portion 159d to the perimeter wall 126.

Figure 17:
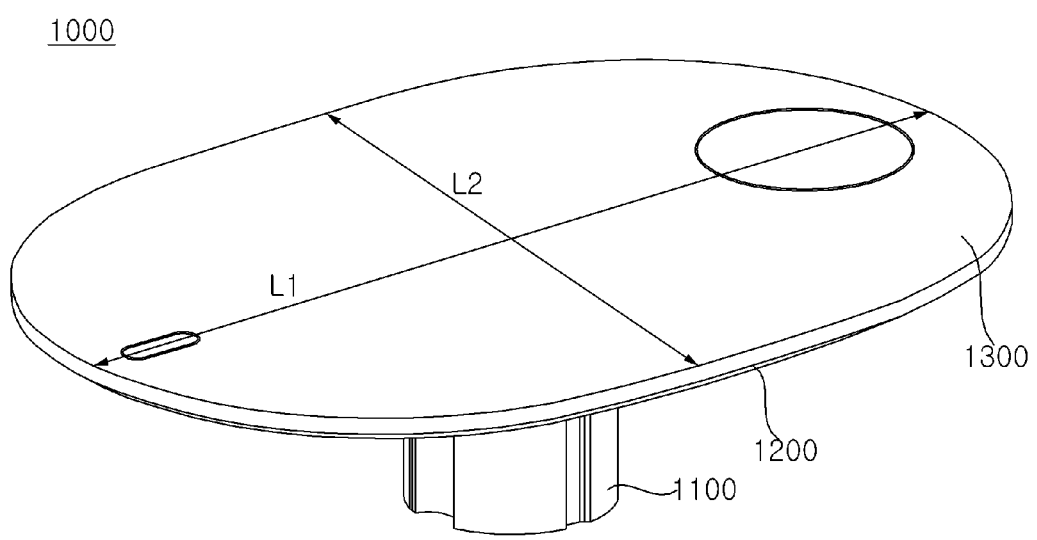
FIG. 17 is a view of a part of the air purifier according to an embodiment of the present disclosure.
Figure 18:
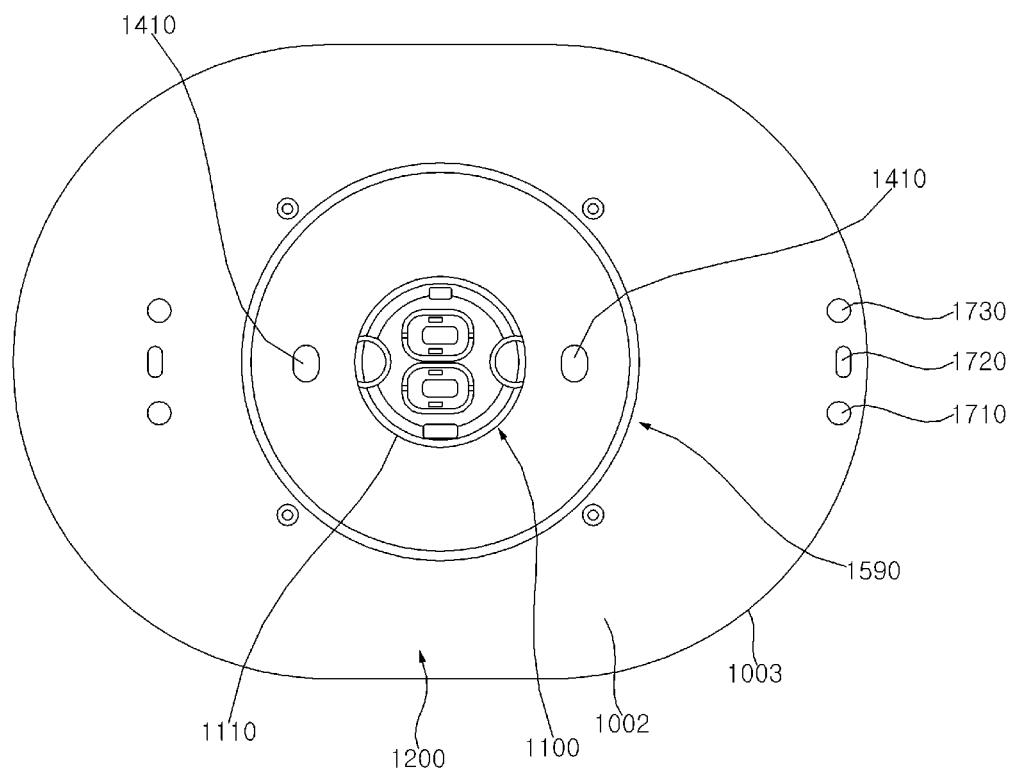
FIG. 18 is a view of a part of the air purifier according to an embodiment of the present disclosure.
Figure 19:
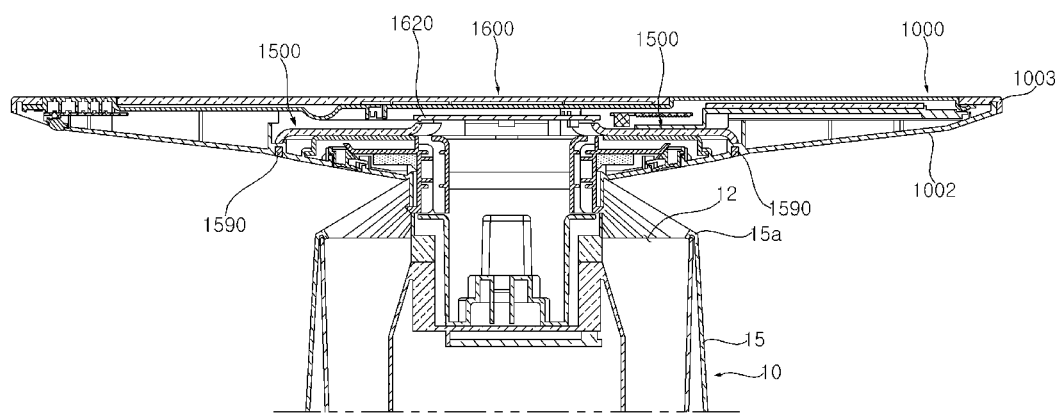
FIG. 19 is a part of a sectional view of the air purifier according to an embodiment of the present disclosure.

Hereinafter, aspects of a non-circular second body 1000 according to an embodiment of the present disclosure will be described with reference to FIGS. 17 to 19. FIG. 17. Is a perspective view of the second body 1000 according to the present disclosure. FIG. 18. Is a bottom view of the second body 1000 according to the present disclosure, and FIG. 19. Is a sectional view of the air purifier 1 equipped with the second body 1000 according to the present disclosure.

The first body 10 (see FIG. 1) may be detachably coupled to either the second body 100 described with reference to FIGS. 1 to 16 or the second body 1000 described with reference to FIGS. 17 to 19 optionally. The second body 100 described with reference to FIGS. 1 to 16 may be detachably coupled to the mount 19. The second body 1000 described with reference to FIGS. 17 to 19 may be detachably couple to the mount 19 in a similar manner. That is, the second body 100, 1000 is compatible with the first body 10.

The description of the second body 100 described with reference to FIGS. 1 to 16 may be equally applied to the second body 1000 described with reference to FIGS. 17 to 19. For example, the second body 1000 may include the lower body 1100. The lower body 1100 may be coupled to the first body 10 (see FIG. 1). The lower body 1100 may have a substantially cylindrical shape or other shape to be received in mount 19. The lower body 1100 may generally have a structure corresponding to a structure of the lower body 110 of FIGS. 1 to 16.

The second body 1000 may include an upper body 1200. The upper body 1200 may be disposed above the upper body 1100. A length L1 of the upper body 1200 in a first direction (e.g., a major axis) may be greater than a length L2 of the upper body 1200 in a second direction (e.g., a minor axis). A horizontal section of the upper body 1200 may have an elliptical shape. In this example, unlike the upper body 120 of the first embodiment having a circular section, the upper body 1200 of the second embodiment may have an elliptical shape. An area of the horizontal section of the upper body 1200 of the second embodiment may be greater than an area of the horizontal section of the upper body 120 of the first embodiment when the horizontal section of the upper body 120 has a radius of length L2. The description of the upper body 120 described with reference to FIGS. 1 to 16 may generally be equally applied to the upper body 1200 of the second embodiment except for difference in shape described above.

The second body 1000 may include a top cover 1300. The top cover 1300 may be disposed above the upper body 1200. A length L1 of the top cover 1300 in a first direction may be greater than a length L2 of the top cover 1300 in a second direction. A horizontal section of the top cover 1300 may have an elliptical shape. That is, unlike the top cover 130 of the first embodiment having a substantially circular section, the top cover 1300 of the second embodiment may have a substantially elliptical shape. An area of the horizontal section of the top cover 1300 of the second embodiment may be greater than an area of the horizontal section of the top cover 130 of the first embodiment given a similar width (L2). The description of the top cover 130 described with reference to FIGS. 1 to 16 may generally be equally applied to the top cover 1300 of the second embodiment except for difference in shape described above.

Hereinafter, aspects of the second body 1000 according to present disclosure will be described with reference to FIG.

18. The second body 1000 may include a lower body 1100 having a cylindrical shape. The lower body 1100 may include an outer circumferential surface 1100 having a cylindrical shape.

The second body 1000 may include a lower wall 1002 that is inclined. The second body 1000 may include an edge 1003. The second body may include a coupling device button 1410. The coupling device button 1410 may be exposed on a lower side of the lower wall 1002. The second body 1000 may include a lamp (or outer light guide) 1510. The lamp 1510 may be exposed on lower side of the lower wall 1002.

The second body may include buttons 1710, 1720, 1730. The buttons 1710, 1720, 1730 may be located closer to the edge 1003 than the outer circumferential surface 1110. A distance between the buttons 1710, 1720, 1730 and the outer circumferential surface 1110 may be greater than a distance between the buttons 1710, 1720, 1730 and the edge 1003. The buttons 1710, 1720, 1730 may be located farther from the lower body 1100 than the coupling device button 1410. A distance between the buttons 1710, 1720, 1730 and the lower body 1100 may be greater than a distance between the buttons 1710, 1720, 1730 and the coupling device button 1410.

The coupling device button 1410 and the buttons 1710, 1720, 1730 may be located on a long axis (e.g., along length L1) of the upper body 1200. The horizontal section of the upper body 1200 may be an elliptical shape, and the coupling device button 1410 and the buttons 1710, 1720, 1730 may be arranged along the long axis of the upper body 1200.

Hereinafter, aspects of the second body 1000 according to the present disclosure will be described with reference to FIG. 19. The second body 1000 may include a light guide (or inner light guide) 1500, a lamp (or outer light guide) 1590, a substrate 1600, and a light source 1620. Descriptions of the elements 150, 159, 160 and 162 described with reference to FIGS. 1 to 16 may generally be equally applied, respectively, to the elements 1500, 1590, 1600 and 1620.

The substrate 1600 may be disposed above the lower body 110. The substrate 1600 may be disposed on a central portion of the second body 1000. A plurality of light sources 1620 may be disposed along a circumference of the substrate 1600 to be spaced apart from each other.

The light guide 1500 may be disposed near or below the substrate 1600. The light guide 1500 may guide light emitted from the light source 1620 toward an outside of the second body 1000 (e.g., to lamp 1590).

The lamp 1590 may emit light transmitted through the light guide 1500 toward a lower side of the lower wall 1002. The lamp 1590 may be located on the outer side than the outer wall 15 of the first body 10. The lamp 1590 may emit light toward an outside of the first body 10.

According to at least one of the embodiments of the present disclosure, as the second body is disposed above the first body having the outlet, things may be placed on the second body. According to at least one of the embodiments of the present disclosure, by providing the light guide extending along a circumference of the air purifier, operation status of the air purifier may be delivered to the outside through the light guide.

According to at least one of the embodiments of the present disclosure, as the light guide extends along a circumference of the air purifier, light may be emitted in all directions of the air purifier in 360 degrees. According to at least one of the embodiments of the present disclosure, as the light guide receiving light from the light source extends toward the outside of the air purifier, it is possible to minimize the number of light sources and deliver light to the outside of the air purifier.

According to at least one of the embodiments of the present disclosure, as providing the lamp receiving light from the light guide, the light may be easily emitted toward the outside of the air purifier. According to at least one of the embodiments of the present disclosure, light transmitting structure may be stably fixed to the air purifier by a coupling method between the lamp and the second body. According to at least one of the embodiments of the present disclosure, as the lamp is located outer side than the first body, the irradiated light may not interfere with the first body.

It is an aspect of the present disclosure to solve the above and other problems in air purifiers. Another aspect of the present disclosure may be to provide an air purifier on which things can be place thereon. Another aspect of the present disclosure may be to provide an air purifier displaying information on operation status. Another aspect of the present disclosure may be to diffuse light in all directions of 360 degrees. Another aspect of the present disclosure may be to minimize the number of light sources required for light diffusion. Another aspect of the present disclosure may be to simplify the assembly of the light guide. Another aspect of the present disclosure may be to easily diffuse light to the outside of the air purifier. Another aspect of the present disclosure may be to prevent light irradiated to the outside of the air purifier from interfering with other parts of the air purifier. The aspect of the present disclosure are not limited to the aspects described above, and other aspects not stated herein will be clearly understood by those skilled in the art from the description.

In accordance with an aspect of the present disclosure, an air purifier includes a first body having an inlet, and an outlet and extending in an up-and-down direction. The air purifier includes a fan disposed inside the first body. The air purifier includes a second body coupled to the first body.

The second body includes a central portion located above the first body. The second body extends from the central portion in a direction crossing the up-and-down direction.

The air purifier includes a substrate electrically connected to an external power source. The air purifier includes a light source electrically connected to the substrate. The light source is located at the central portion or at a position corresponding to the central portion in the up-and-down direction.

The air purifier includes a light guide facing the light source and extending in a direction away from the central portion, so it is possible to diffuse light to an outside of the second body even with a small number of light sources. The light guide may extend along a circumferential surface of the second body at an outside of a plurality of light sources. The light guide may include a light receive portion facing the plurality of the light sources.

The light guide may include a light channel extending from the light receive portion toward an outside of the second body. The light guide may include a light emit portion extending from the light channel toward the outside of the second body. The light guide may include a plurality of light receive protrusions protruding from the light receive portion to the plurality of light sources and spaced apart from each other along in a direction in which the plurality of light sources are spaced apart. The light receive portion may face the plurality of light sources in the up-and-down direction and extend curvedly to the outside of the second body along the up-and-down direction.

The light channel may extend toward the outside of the second body. The light emit portion may curvedly extend from the light channel to the outside of the second body along the up-and-down direction. The light guide may include a coupling rib facing the substrate and the second body in the up-and-down direction. The light guide may extend toward outer side than an outer wall of the first body and emit light toward an outside of the first body.

The air purifier may include a lamp receiving light from the light guide and irradiate light to the outside of the second body. The lamp may be disposed to face the light guide and space below the light guide. The lamp may be detachably disposed on the second body. The lamp may be detachable with the light guide.

The second body may include a perimeter wall extending along a circumference of the second body. The second body may include a step portion spaced apart from the perimeter wall. The second body may include a connecting rib connecting the perimeter wall and the step portion.

The lamp may include a plurality of lamp protrusions spaced apart in a circumferential direction of the second body. The lamp may include lamp grooves defined between the plurality of the lamp protrusions and into which the connecting rib is inserted. The second body may include a recess depressed in the perimeter wall. The lamp may include a hooking portion protruding toward the recess.

In accordance with an aspect of the present disclosure, an air purifier may include a first body having an inlet, an outlet, and an outer wall defining a space therein; a fan disposed inside the first body; a second body coupled to the first body, and having an edge located outer side than the outer wall of the first body; a light source generating light; and a lamp emitting light received from the light source toward an outside of the second body and located outer side than the outer wall of the first body, so it is possible to prevent light emitted through the lamp from interfering with the first body.

The lamp may extend along a circumferential direction of the second body at outer side than the outer wall of the first body. A distance between the lamp and the edge of the second body may be greater than a distance between the lamp and the outer wall of the first body. The substrate may be disposed to correspond to an upper side of the first body. The lamp may be located outer side than the outer wall of the first body. The light emit portion may extend curvedly downward toward the outside of the first body. Details of other embodiments are included in the detailed description and the accompanying drawings. The aspects of the present disclosure are not limited to the aspects described above, and other aspects not mentioned will be clearly understood by those skilled in the art from the claims.

Although the preferred embodiments of the present disclosure have been shown and described above, the present disclosure is not limited to the specific embodiments described above, and variously modified implementations are possible by those skilled in the art to which the present disclosure pertains without departing from the gist of the present disclosure claimed in the claims, and these modifications should not be individually understood from the technical idea or perspective of the present disclosure.

The scope of the present disclosure is not limited to the above-described embodiments, which may be implemented in various forms. Therefore, if the modified embodiment includes the elements of the claims of the present disclosure, it should be regarded as belonging to the scope of the present disclosure.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier comprising:
a first body having an inlet and an outlet;
a fan provided inside the first body;
a second body coupled to the first body, the second body having a central region located above the first body and a lower wall extending outward from the central region;
a substrate;
a light source that generates light, is connected to the substrate, and is provided inside the second body; and
an inner light guide that is provided inside the second body, and positioned to face the light source to receive light,
wherein the inner light guide extends from the light source to the lower wall to guide light from the light source.

2. The air purifier of claim 1, wherein the inner light guide extends radially outward from the central region of the second body along an extension direction of the second body.

3. The air purifier of claim 1, wherein the inner light guide includes:
a light receiving region facing the light source;
a light channel extending from the light receiving region along an extension direction of the second body; and
a light emitting region extending from the light channel and toward an outside of the second body.

4. The air purifier of claim 3, comprising a plurality of the light sources that are spaced apart and positioned along a circumferential direction of the substrate; and
wherein the inner light guide includes a plurality of light receiving protrusions protruding toward the plurality of light sources and spaced apart from each other along the circumferential direction of the substrate in which the plurality of light sources are positioned.

5. The air purifier of claim 3, wherein the light receiving region faces the light source in a vertical direction and extends curvedly toward the outside of the second body in the vertical direction.

6. The air purifier of claim 3, wherein the light channel extends toward the outside of the second body, and
wherein the light emitting region extends curvedly from the light channel toward the outside of the second body along a vertical direction.

7. The air purifier of claim 1, wherein the inner light guide includes a coupling rib facing the substrate and the second body in a vertical direction.

8. The air purifier of claim 1, wherein the inner light guide extends further outward radially out than an outer wall of the first body and outputs light toward an outside of the first body.

9. The air purifier of claim 1, further comprising an outer light guide that receives light from the inner light guide and emits light toward the outside of the second body.

10. The air purifier of claim 9, wherein the outer light guide faces the inner light guide and is spaced apart in a downward direction from the inner light guide.

11. The air purifier of claim 9, wherein the outer light guide is detachably coupled to the second body, and detachably coupled to the inner light guide.

12. The air purifier of claim 9,
wherein the second body includes:
a perimeter wall extending along a circumference of the second body;
a step wall spaced apart from the perimeter wall; and
a connecting rib connecting the perimeter wall and the step wall,
wherein the outer light guide includes:
a plurality of lamp protrusions spaced apart in a circumferential direction of the second body; and
a lamp groove defined between a pair of the plurality of lamp protrusions, and into which the connecting rib is inserted.

13. The air purifier of claim 9, wherein the second body includes:
a perimeter wall extending along a circumference of the second body; and
a recess provided in the perimeter wall,
wherein the outer light guide includes a hook protruding toward the recess to couple the outer light guide to the second body.

14. An air purifier comprising:
a first body having an inlet, an outlet, and an outer wall;
a fan provided inside the first body;
a second body that is coupled to the first body and extends farther out radially than the outer wall of the first body;
a light source that generates light; and
an outer light guide that emits light received from the light source toward an outside of the second body and is located farther out radially from a center axis of the first body than the outer wall of the first body.

15. The air purifier of claim 14, wherein the outer light guide extends along a circumferential direction of the second body at a position that is farther out radially than the outer wall of the first body.

16. The air purifier of claim 14, wherein a distance between the outer light guide and the edge of the second body is greater than a distance between the outer light guide and the outer wall of the first body.

17. The air purifier of claim 14, further comprising:
a substrate on where the light source is provided; and
an inner light guide carrying light emitted from the light source to the outer light guide,
wherein the substrate is vertically aligned with positioned over the first body.

18. The air purifier of claim 14, further comprising an inner light guide provided to face the light source and extending toward the outer light guide.

19. The air purifier of claim 18, wherein the inner light guide includes:
a light receiving region positioned to face the light source;
a light channel extending from the light receive region toward an outside of the first body; and
a light emitting region facing the outer light guide and located radially farther out than the outer wall of the first body.

20. The air purifier of claim 19, wherein the light emitting region extends curvedly downward toward the outside of the first body.

* * * * *